US012077423B2

(12) United States Patent
Lee et al.

(10) Patent No.: US 12,077,423 B2
(45) Date of Patent: *Sep. 3, 2024

(54) DUAL-MODE FLUID CONNECTOR HAVING ROTATABLE ELEMENT

(71) Applicant: Botrista, Inc., Kent County, DE (US)

(72) Inventors: Yu-Min Lee, New Taipei (TW); Wu-Chou Kuo, Taipei (TW)

(73) Assignee: BOTRISTA, INC., Kent County, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/375,075

(22) Filed: Sep. 29, 2023

(65) Prior Publication Data

US 2024/0025721 A1 Jan. 25, 2024

Related U.S. Application Data

(60) Division of application No. 17/467,960, filed on Sep. 7, 2021, now Pat. No. 11,814,280, which is a (Continued)

(51) Int. Cl.
*B67D 1/07* (2006.01)
*B67D 1/12* (2006.01)

(52) U.S. Cl.
CPC ............. *B67D 1/07* (2013.01); *B67D 1/1277* (2013.01)

(58) Field of Classification Search
CPC ................................ B67D 1/07; B67D 1/1277
See application file for complete search history.

(56) References Cited

U.S. PATENT DOCUMENTS 6,669,051 B1 12/2003 Phallen et al.
6,695,168 B2 2/2004 Pinedjian et al.
(Continued)

FOREIGN PATENT DOCUMENTS

CN 102781293 A * 11/2012 ............. A47J 31/46
CN 104154267 A 11/2014
(Continued)

OTHER PUBLICATIONS

Translation of CN-102781293-A.*
(Continued)

*Primary Examiner* — Jeremy Carroll
(74) *Attorney, Agent, or Firm* — Birch, Stewart, Kolasch & Birch, LLP

(57) ABSTRACT

A dual-mode fluid connector includes: a hollow connecting element, comprising a chamber inside the hollow connecting element; a material tube, positioned on the hollow connecting element and connected through the chamber; a cleaning tube, positioned on the hollow connecting element and connected through the chamber; a head portion, positioned on one terminal of the hollow connecting element and having a connecting opening, wherein the connecting opening can be detachably connected to a material container; a rear portion, positioned on another terminal of the hollow connecting element and having a through hole; a rod, inserted into the chamber via the through hole; and a rotatable element, covered on the rear portion and comprising a block portion, wherein the block portion is positioned in an interior of the rotatable element and arranged to operably engage with the outer flange.

18 Claims, 29 Drawing Sheets

Related U.S. Application Data continuation-in-part of application No. 17/218,314, filed on Mar. 31, 2021, now Pat. No. 11,597,642.

(60) Provisional application No. 63/110,621, filed on Nov. 6, 2020, provisional application No. 63/143,217, filed on Jan. 29, 2021.

(56) References Cited

U.S. PATENT DOCUMENTS

| | | | | |
|---|---|---|---|---|
| 10,561,281 | B1 * | 2/2020 | Lu | E03C 1/0408 |
| 10,662,053 | B2 * | 5/2020 | Petermann | B67D 1/0888 |
| 10,689,239 | B1 | 6/2020 | Siegel | |
| 11,407,629 | B1 * | 8/2022 | Siegel | B67D 1/0878 |
| 2011/0049185 | A1 | 3/2011 | Buchik | |
| 2016/0297665 | A1 | 10/2016 | Petermann | |
| 2021/0316979 | A1 | 10/2021 | Hayes-Pankhurst et al. | |

FOREIGN PATENT DOCUMENTS

| | | | |
|---|---|---|---|
| CN | 102781293 | B | 8/2015 |
| WO | WO 2011/107574 | A2 | 9/2011 |

OTHER PUBLICATIONS

Chinese Office Action and Search Report for Chinese Application No. 202111040353.0, dated Jan. 27, 2024, with partial English translation.

Taiwanese Notice of Allowance dated Dec. 10, 2021 for Application No. 110133099 with an English translation.

Taiwanese Office Action and Search Report, dated Jul. 14, 2021, for Taiwanese Application No. 110112000, with a partial English translation of the Taiwanese Office Action and a full English translation of the Taiwanese Search Report.

* cited by examiner

DUAL-MODE FLUID CONNECTOR HAVING ROTATABLE ELEMENT

CROSS-REFERENCE TO RELATED APPLICATIONS

This application is a Divisional of co-pending U.S. patent application Ser. No. 17/467,960, filed on Sep. 7, 2021, which is a Continuation-In-Part of and claims the benefit of priority to U.S. patent application Ser. No. 17/218,314, filed on Mar. 31, 2021; which claims the benefit of U.S. Provisional Application Ser. No. 63/110,621, filed on Nov. 6, 2020, and the benefit of U.S. Provisional Application Ser. No. 63/143,217, filed on Jan. 29, 2021; the entirety of which is incorporated herein by reference for all purposes.

BACKGROUND

The disclosure generally relates to a fluid connector and, more particularly, to a dual-mode fluid connector having a rotatable element and capable of being switched between different operating modes.

For many consumers, freshly made beverages are more attractive than factory-produced canned or bottled beverages in many aspects, such as freshness, taste, and/or flexibility of customizing ingredient combination. Therefore, many restaurants and beverage vendors offer a variety of freshly made beverages to meet the needs of their customers. As a result of rising labor costs and other factors (e.g., increased operating costs due to the impact of the pandemic or inflation), many restaurants and beverage vendors have begun to use a variety of machinery and equipment to provide or assist in the preparation of freshly-made beverages in order to reduce the required labor time and costs.

It is well known that a traditional beverage preparing machine is equipped with many tubes for transmitting material liquids and those tubes are placed inside the beverage preparing machine. These tubes have to respectively be connected to different material containers through suitable connectors, so that the beverage preparing machine can acquire various materials for preparing beverages. The quantity of the connectors employed in each beverage preparing machine increases as the quantity of the material containers connected to the beverage preparing machine increases. Since the traditional beverage preparing machine does not have an automatic cleaning functionality, it usually consumes a lot of labor and time to clean various components, tubes, and connectors inside the beverage preparing machine, so as to prevent the components, tubes, and connectors inside the beverage preparing machine from growing bacteria or generating toxins.

One of the difficulties in realizing the automatic cleaning functionality of the beverage preparing machine is that the traditional connector can only simply transmit the liquid from a material container to a corresponding tube. Therefore, the cleaner has to manually remove multiple connectors from different material containers one by one when cleaning the beverage preparing machine, then the cleaner manually cleans or utilizes other assisting equipment to clean the related components, multiple tubes, and multiple connectors. When the cleaning procedure is completed, multiple connectors shall be manually connected between corresponding material containers and tubes by the cleaner one by one. The aforementioned approach of manually removing multiple connectors one by one and finally connecting the multiple connectors back one by one not only consumes a lot of labor time, but also easily makes the surrounding environment dirty during removing the connectors, and usually causes the connectors to be scratched or even damaged.

SUMMARY

An example embodiment of a dual-mode fluid connector is disclosed, comprising: a hollow connecting element, comprising a chamber inside the hollow connecting element; a material tube, positioned on the hollow connecting element and connected through the chamber; a cleaning tube, positioned on the hollow connecting element and connected through the chamber; a head portion, positioned on one terminal of the hollow connecting element and comprising a connecting opening, wherein the connecting opening is connected through the chamber and capable of being detachably connected to a material container; a rear portion, positioned on another terminal of the hollow connecting element and comprising a through hole; a rod, inserted into the chamber via the through hole and comprising a rod head and an outer flange; and a rotatable element, covered on the rear portion and comprising a block portion, wherein the block portion is positioned in an interior of the rotatable element and arranged to operably engage with the outer flange.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
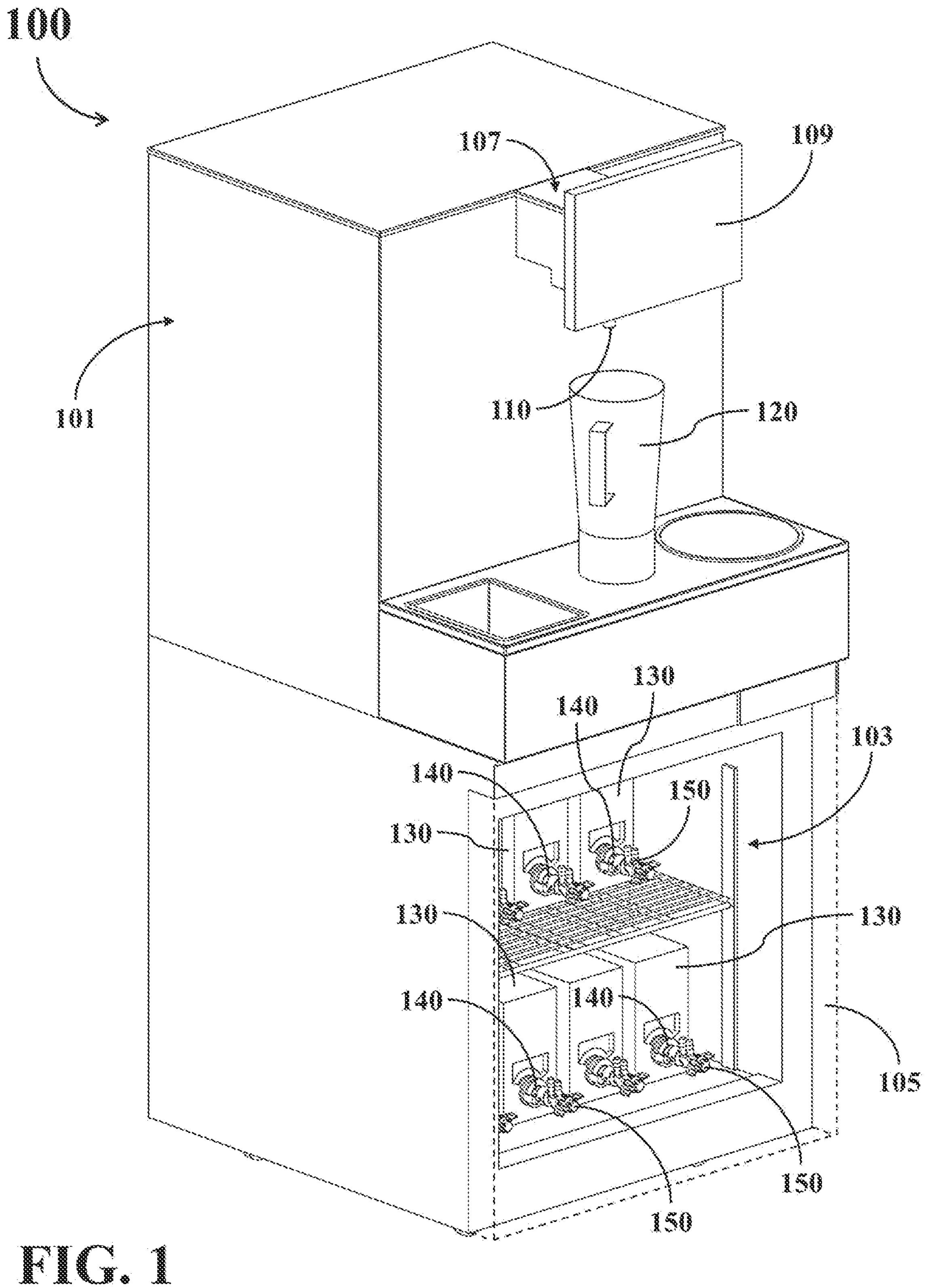
FIG. 1 shows a simplified schematic perspective diagram of an automated beverage preparation apparatus according to one embodiment of the present disclosure.

Please refer to FIG. 1, which shows a simplified schematic perspective diagram of an automated beverage preparation apparatus 100 according to one embodiment of the present disclosure. The automated beverage preparation apparatus 100 comprises an upper chamber 101, a lower chamber 103, a door 105, a neck chamber 107, a control panel 109, one or more outlet connectors 110, and multiple dual-mode fluid connectors 150.

In order to reduce the complexity of the drawing contents, the door 105 of the lower chamber 103 is deliberately represented by dashed lines in FIG. 1, while some internal objects to be further described in the following are depicted with solid lines. Please note that the appearance shape of the automated beverage preparation apparatus 100 shown in FIG. 1 is merely a simplified schematic diagram for the purpose of explanatory convenience, rather than a restriction to the actual appearance of the automated beverage preparation apparatus 100.

The upper chamber 101 of the automated beverage preparation apparatus 100 may be connected to the neck chamber 107, and may be connected to the lower chamber 103. Relevant wires, signal lines, connectors, material transmission pipes, and/or detergent transmission pipes may be arranged inside the automated beverage preparation apparatus 100 in a variety of appropriate ways.

In practice, multiple pumps, multiple damper devices, multiple flowmeters, and one or more cleaning systems may be arranged inside the automated beverage preparation apparatus 100.

The aforementioned multiple pumps may be respectively connected to other components through various suitable material transmission pipes and connectors, and may also be installed within the upper chamber 101 in a variety of appropriate spatial arrangements.

The aforementioned multiple damper devices and multiple flowmeters may be respectively connected to other components through various suitable material transmission pipes and connectors, and may be installed within the upper chamber 101 and/or the neck chamber 107 in a variety of appropriate spatial arrangements.

The aforementioned one or more cleaning systems may be respectively connected to other components through various suitable detergent transmission pipes and connectors, and may be installed within the upper chamber 101, the lower chamber 103, and/or the neck chamber 107 in a variety of appropriate spatial arrangements.

The aforementioned one or more outlet connectors 110 may be respectively connected to other components through various suitable material transmission pipes and connectors. For example, the input terminal of respective outlet connectors 110 may be connected to the output terminal of a corresponding pump, the output terminal of a corresponding damper device, or the output terminal of a corresponding flowmeter through various suitable material transmission pipes and connectors. The output terminals of respective outlet connectors 110 may be exposed outside the neck chamber 107 to facilitate the user to carry out relevant cleaning procedures.

As shown in FIG. 1, multiple material containers 130 may be placed within the lower chamber 103 of the automated beverage preparation apparatus 100. The material containers 130 may be utilized to store different liquid materials required for preparing freshly made beverages. Each material container 130 is equipped with an outlet check valve 140, which is utilized as an output connector.

The aforementioned multiple dual-mode fluid connectors 150 may be detachably connected to the outlet check valves 140 on different material containers 130. In addition, each dual-mode fluid connector 150 may be connected to a corresponding pump or damper device through various suitable material transmission pipes, and may be connected to a corresponding pump or cleaning system through various suitable detergent transmission pipes.

Various suitable material dispensing devices (e.g., a combination of a pump, a damper device, a flowmeter, and suitable material transmission pipes) may arranged in the automated beverage preparation apparatus 100 to transmit the liquid materials from respective material containers 130 to the output terminals of corresponding outlet connectors 110 through corresponding dual-mode fluid connectors 150. In addition, various suitable detergent transmission devices (e.g., a combination of a pump, a flowmeter, and suitable detergent transmission pipes) may be arranged in the automated beverage preparation apparatus 100 to transmit the detergent from the aforementioned cleaning system to respective dual-mode fluid connectors 150.

In practice, appropriate refrigeration equipment may be installed within the automated beverage preparation apparatus 100 to extend the storage time of various liquid materials in the material containers 130 within the lower chamber 103. In addition, when the door 105 is closed, the lower chamber 103 may be isolated from the external environment, which is conducive to maintaining the low temperature state in the lower chamber 103, and may avoid foreign objects such as insects or small animals from invading the lower chamber 103.

In order to reduce the complexity of the drawing contents, other structures and devices within the automated beverage preparation apparatus 100 are not shown in FIG. 1, such as the internal pumps, damper devices, flowmeters, control circuit, electrical wires, signal lines, material transmission pipes connected between different components, detergent transmission pipes connected between different components, refrigeration equipment, power supply apparatus, and relevant components and frames for supporting or securing the above components.

In operations, a user may manipulate the control panel 109 to configure one or more production parameters for the required freshly made beverage, such as beverage item, cup size, beverage volume, sugar level, ice level, and/or quantity of cups, or the like.

Then, the automated beverage preparation apparatus 100 would operate based on the parameters configured by the user to automatically utilizes one or more pumps to extract the liquid materials from one or more material containers 130, and to transmits the extracted liquid material toward corresponding outlet connectors 110 through respective transmission pipes. With the continuous operation of respective pump, the liquid material within the output connector 110 will be outputted to the beverage container 120 through corresponding outlet connector 110.

Freshly made beverage of a variety of flavors can be obtained by mixing different liquid materials together in the beverage container 120 according to a particular ratio, or by simple stirring after mixing the liquid materials. In practice, the beverage container 120 may be designed to support or have a blending functionality to increase the speed and uniformity of mixing the liquid materials.

Figure 2:
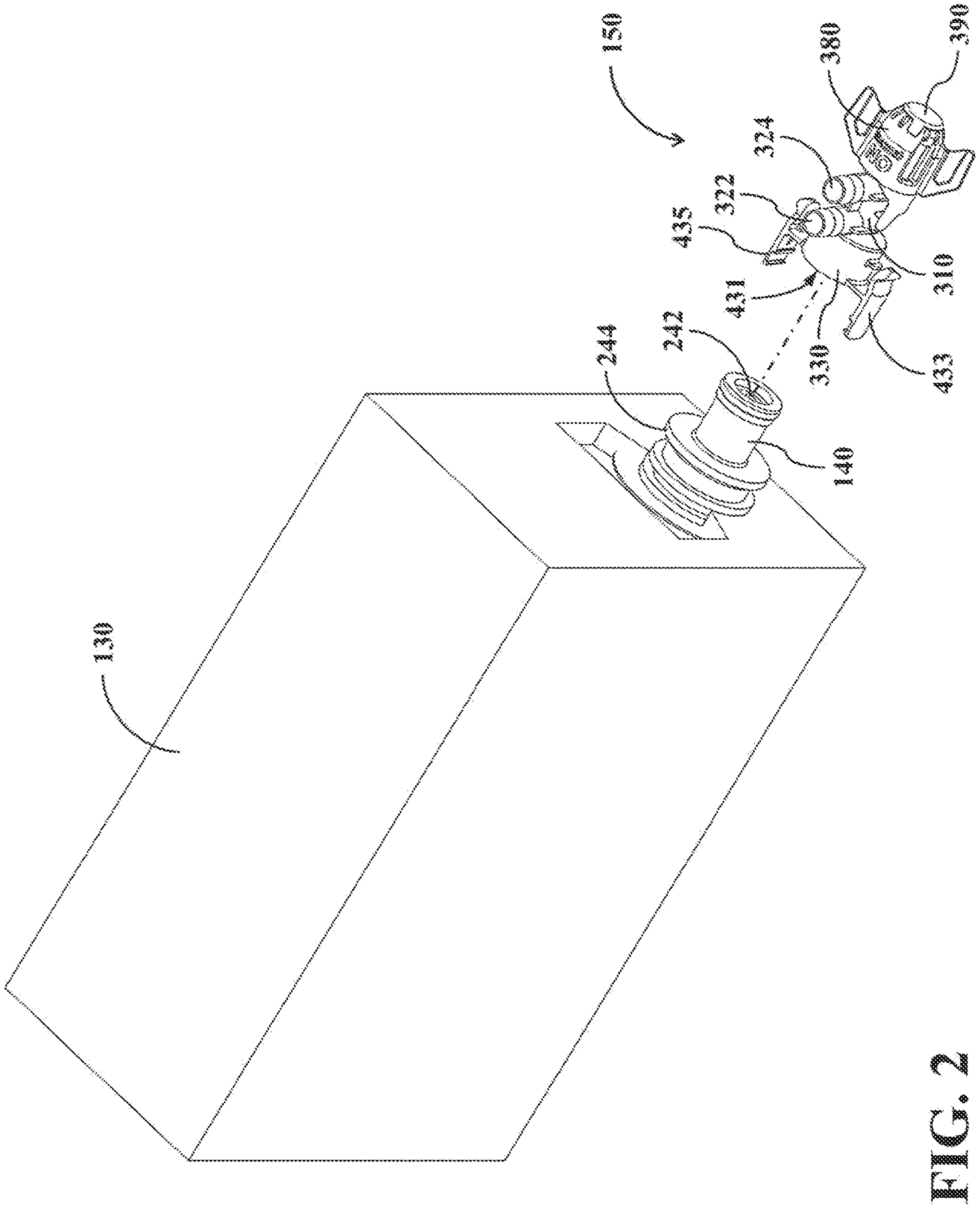
FIG. 2 shows a simplified schematic diagram of a dual-mode fluid connector and a material container when they are detached from each other according to one embodiment of the present disclosure.
Figure 3:
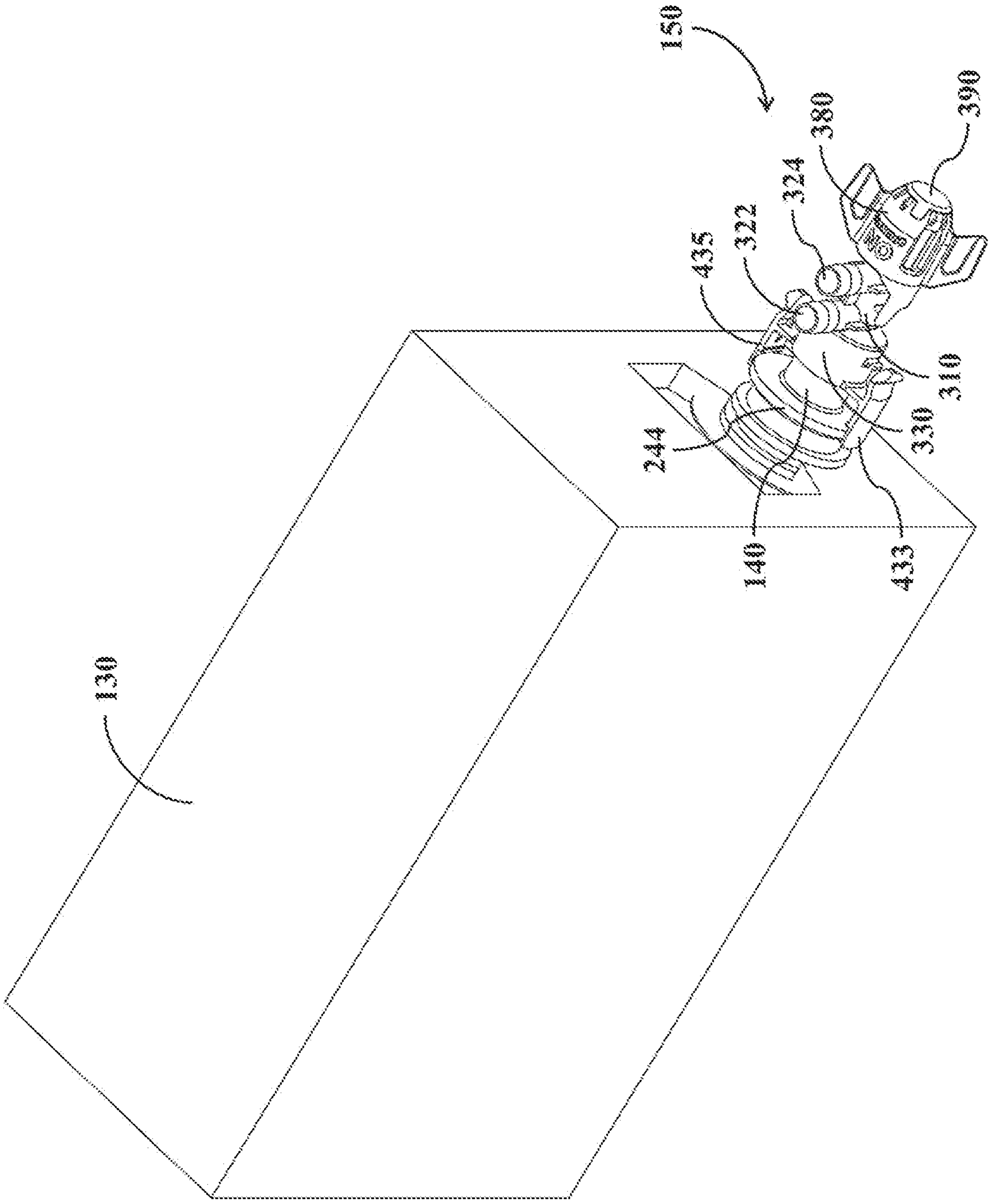
FIG. 3 shows a simplified schematic diagram of the dual-mode fluid connector and the material container of FIG. 2 when they are connected to each other.

Please refer to FIG. 2 and FIG. 3. FIG. 2 shows a simplified schematic diagram of the dual-mode fluid connector 150 and the material container 130 when they are detached from each other according to one embodiment of the present disclosure. FIG. 3 shows a simplified schematic diagram of the dual-mode fluid connector 150 and the material container 130 of FIG. 2 when they are connected to each other.

As shown in FIG. 2, the outlet check valve 140 on the material container 130 comprises a stopper 242 and a protruding portion 244 protruding outward from an outer surface of the outlet check valve 140. The dual-mode fluid connector 150 comprises a hollow connecting element 310, a material tube 322, a cleaning tube 324, a head portion 330, a rotatable element 380, and a plug 390.

The stopper 242 of the outlet check valve 140 may be realized with various suitable spheres, plugs, or lumps. The protruding portion 244 may be realized with a single ring element or may be realized with multiple separated protruding structures. A spring (not illustrated in FIG. 2 and FIG. 3) is usually arranged inside the outlet check valve 140 and may apply a force on the stopper 242 to push the stopper 242 outward.

Before the outlet check valve 140 is connected to the dual-mode fluid connector 150, the force applied on the stopper 242 by the aforementioned spring renders the stopper 242 to block the output terminal of the outlet check valve 140, so that the output terminal of the outlet check valve 140 remains in a close status to prevent the liquid material in the material container 130 from leaking.

In the dual-mode fluid connector 150, the material tube 322 and the cleaning tube 324 are both positioned on the hollow connecting element 310, while the head portion 330 is positioned on one terminal of the hollow connecting element 310 and comprises a connecting opening 431, a first clamp element 433, and a second clamp element 435.

As shown in FIG. 2 and FIG. 3, the first clamp element 433 and the second clamp element 435 are respectively connected to two opposite sides of the head portion 330. When the connecting opening 431 is detachably connected to the outlet check valve 140, the first clamp element 433 and the second clamp element 435 will engage with the protruding portion 244 of the outlet check valve 140 to thereby improve the connection stability between the dual-mode fluid connector 150 and the outlet check valve 140.

The dual-mode fluid connector 150 has two operating modes, which are a serve mode and a clean mode. The user (e.g., the cleaner or the operator of the automated beverage preparation apparatus 100) may easily switch the dual-mode fluid connector 150 between the serve mode and the clean mode.

In one embodiment, when the dual-mode fluid connector 150 operates in the serve mode, the dual-mode fluid connector 150 manipulates the stopper 242 of the outlet check valve 140, so that the output terminal of the outlet check valve 140 stays in an open status. In the meantime, the dual-mode fluid connector 150 also isolates or blocks the transmission channel between the head portion 330 and the cleaning tube 324. Therefore, under the serve mode, the liquid material in the material container 130 is enabled to flow into the dual-mode fluid connector 150 through the outlet check valve 140, but the liquid material received by the dual-mode fluid connector 150 can only flow into the material tube 322 and tubes (not shown in the figures) connected to the material tube 322 through the hollow connecting element 310 and cannot flow into the cleaning tube 324 through the hollow connecting element 310.

On the other hand, when the dual-mode fluid connector 150 operates in the clean mode, the dual-mode fluid connector 150 stops manipulating the stopper 242 of the outlet check valve 140, so that the output terminal of the outlet check valve 140 resumes to be in a close status. Therefore, the liquid material in the material container 130 cannot flow into the dual-mode fluid connector 150 through the outlet check valve 140. In the meantime, the dual-mode fluid connector 150 also resumes the transmission channel between the head portion 330 and the cleaning tube 324. Under the clean mode, the dual-mode fluid connector 150 may receive the detergent through the cleaning tube 324 and tubes (not shown in the figures) connected to the cleaning tube 324, and the detergent is not only allowed to flow into the inner space of the dual-mode fluid connector 150, but also allowed to flow into the material tube 322 through the hollow connecting element 310.

Please note that when the dual-mode fluid connector 150 operates in the clean mode, the output terminal of the outlet check valve 140 is in a close status, thus the detergent received by the dual-mode fluid connector 150 does not flow into the material container 130 through the outlet check valve 140. In other words, even if the dual-mode fluid connector 150 is still connected to the outlet check valve 140, it can effectively prevent the detergent from flowing into the material container 130 and polluting the liquid material by switching the dual-mode fluid connector 150 to the clean mode. Therefore, the user does not need to detach the dual-mode fluid connector 150 from the outlet check valve 140 of the material container 130 before switching the dual-mode fluid connector 150 to the clean mode.

The structures and functionalities of respective components of the dual-mode fluid connector 150 and how to configure the dual-mode fluid connector 150 to operate in the serve mode will be further described below by reference to FIG. 4 through FIG. 21.

Figure 4:
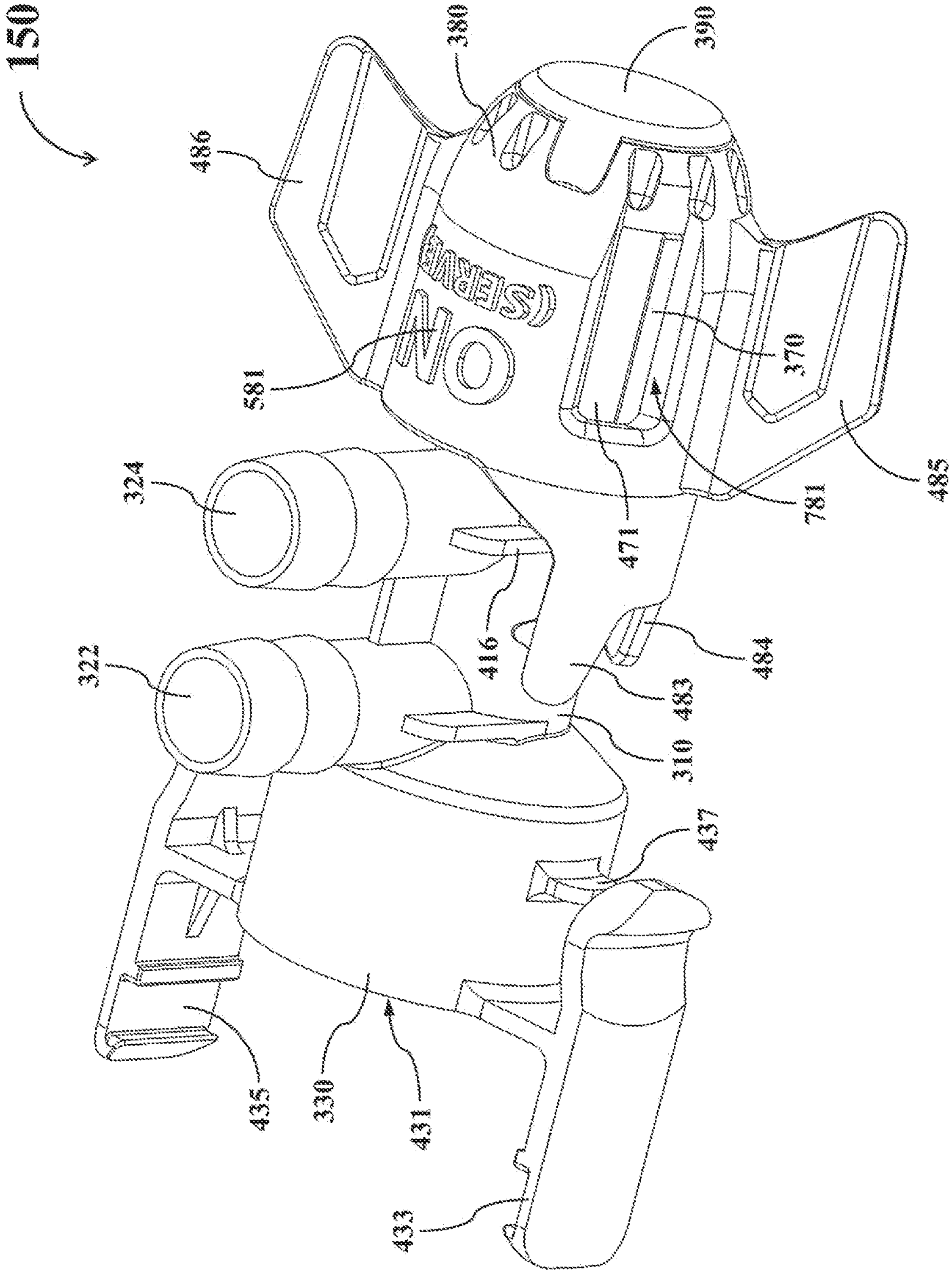
FIG. 4 and FIG. 5 show simplified schematic diagrams of the dual-mode fluid connector operating in a serve mode from different viewing angles according to one embodiment of the present disclosure.
Figure 5:
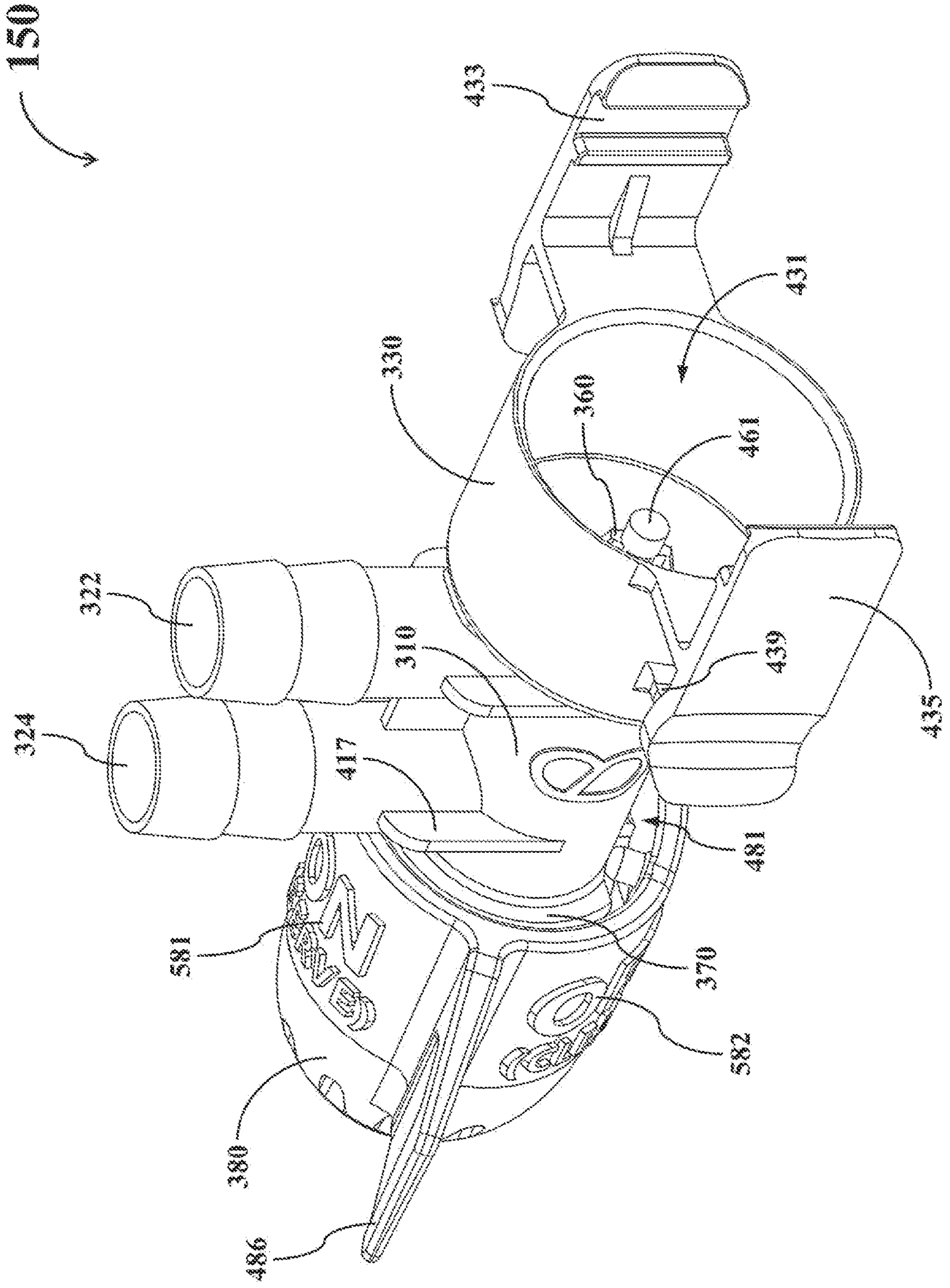
Figure 6:
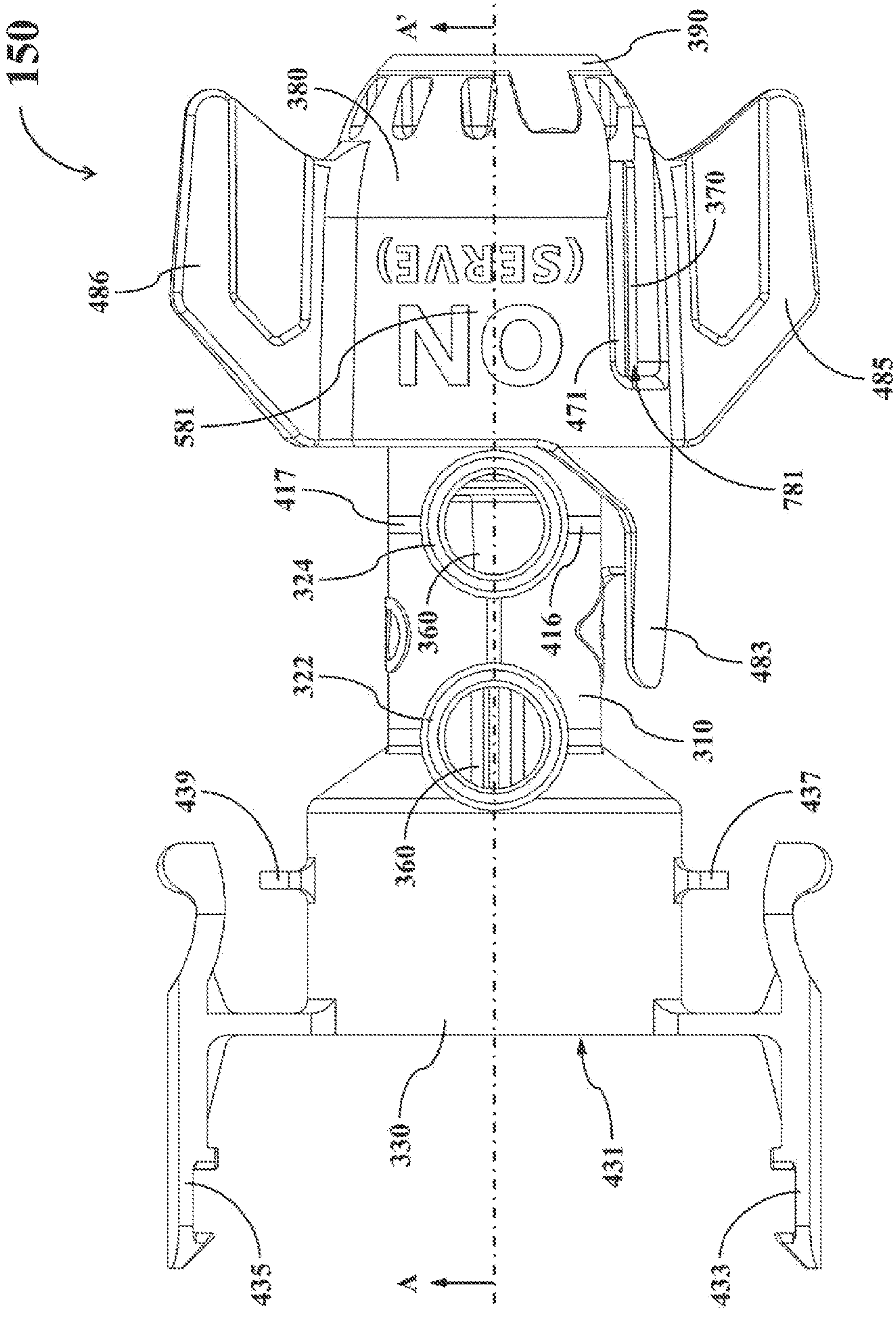
FIG. 6 shows a schematic top view diagram of the dual-mode fluid connector operating in the serve mode according to one embodiment of the present disclosure.
Figure 7:
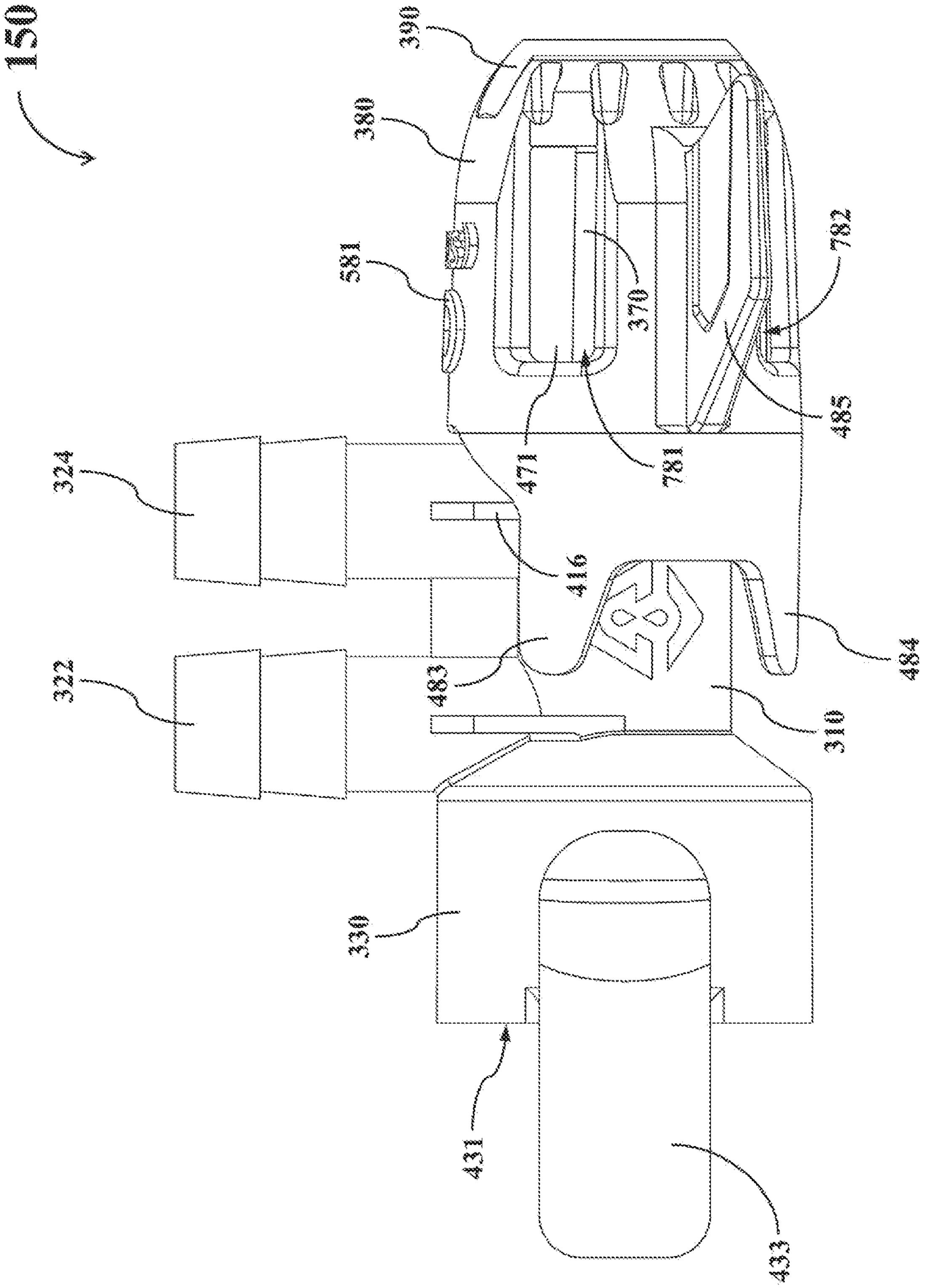
FIG. 7 shows a schematic side view diagram of the dual-mode fluid connector operating in the serve mode according to one embodiment of the present disclosure.
Figure 8:
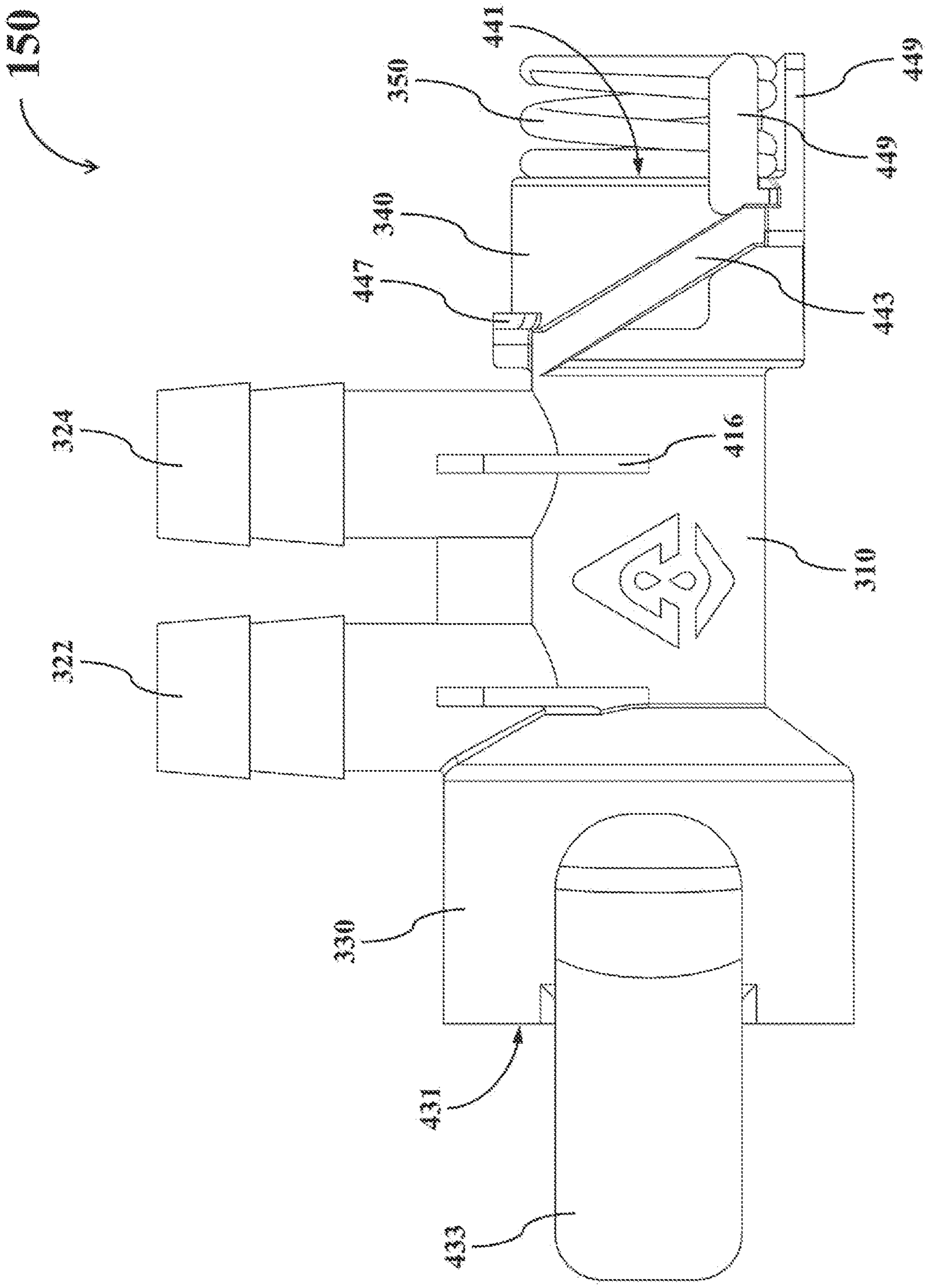
FIG. 8 shows a simplified schematic side view diagram of the dual-mode fluid connector of FIG. 7.
Figure 9:
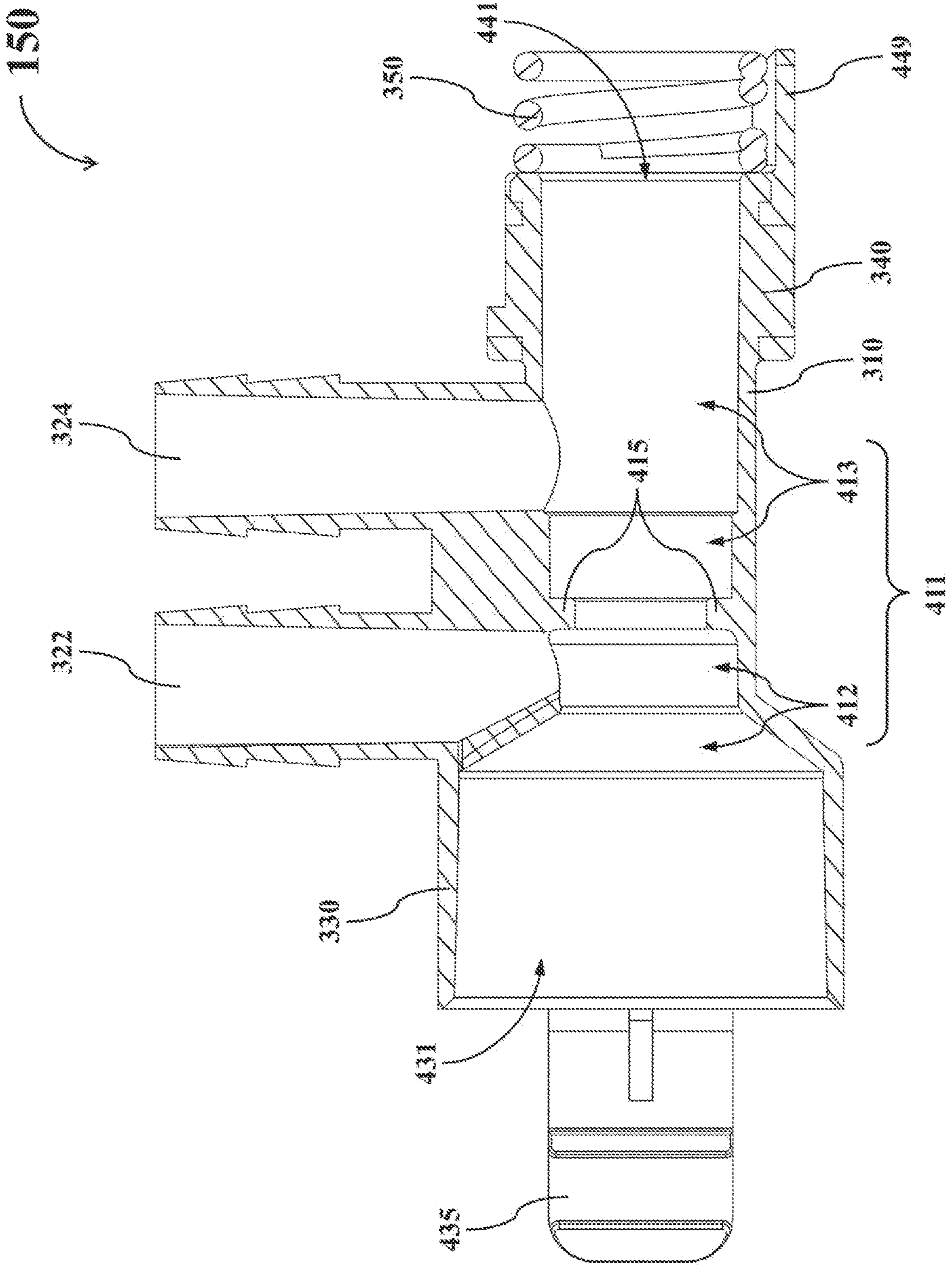
FIG. 9 shows a schematic cross-sectional diagram of the dual-mode fluid connector along the direction A-A' of FIG. 6.
Figure 10:
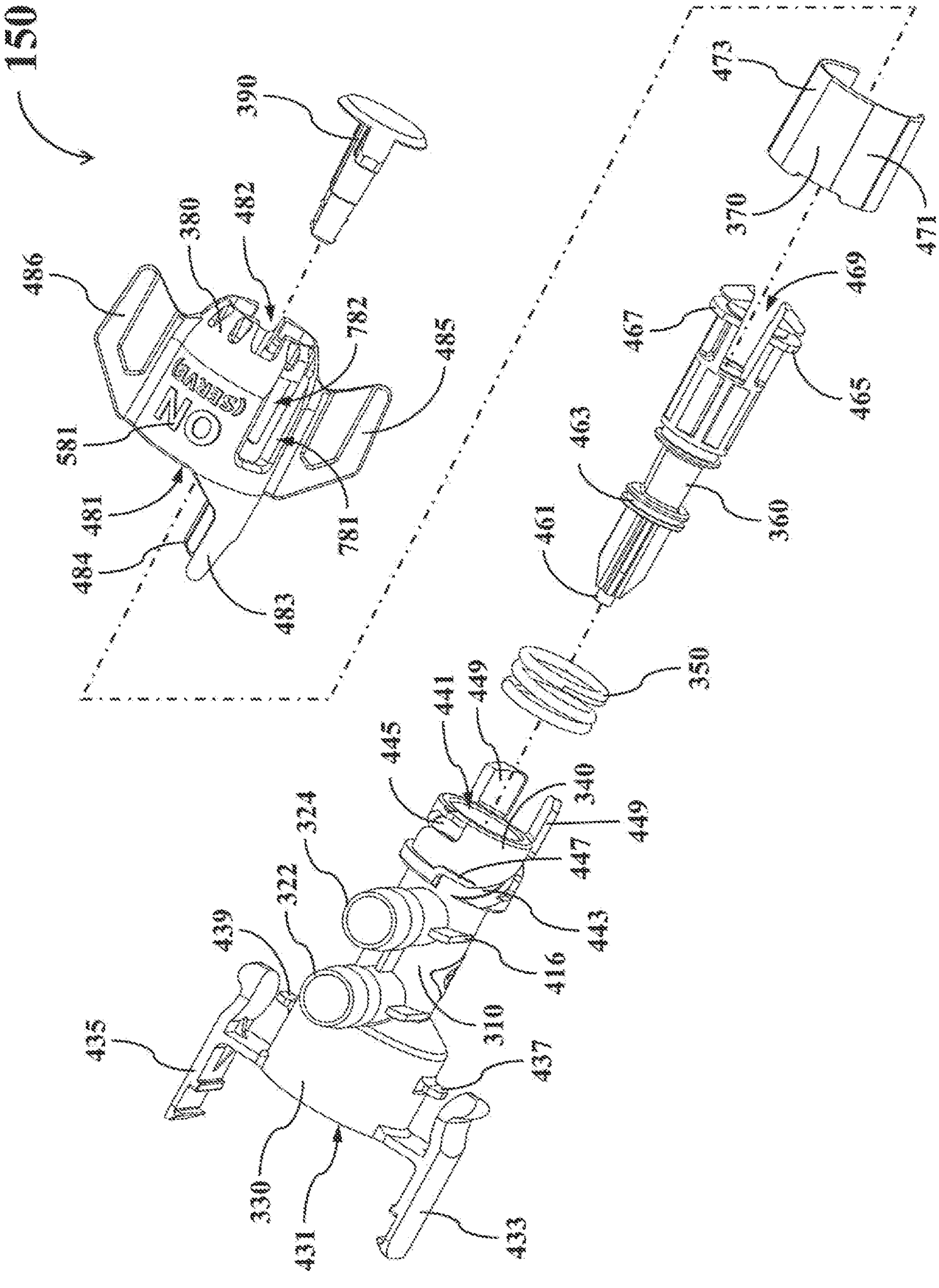
FIGS. 10~11 show simplified schematic decomposed diagrams of the dual-mode fluid connector from different viewing angles according to one embodiment of the present disclosure.
Figure 11:
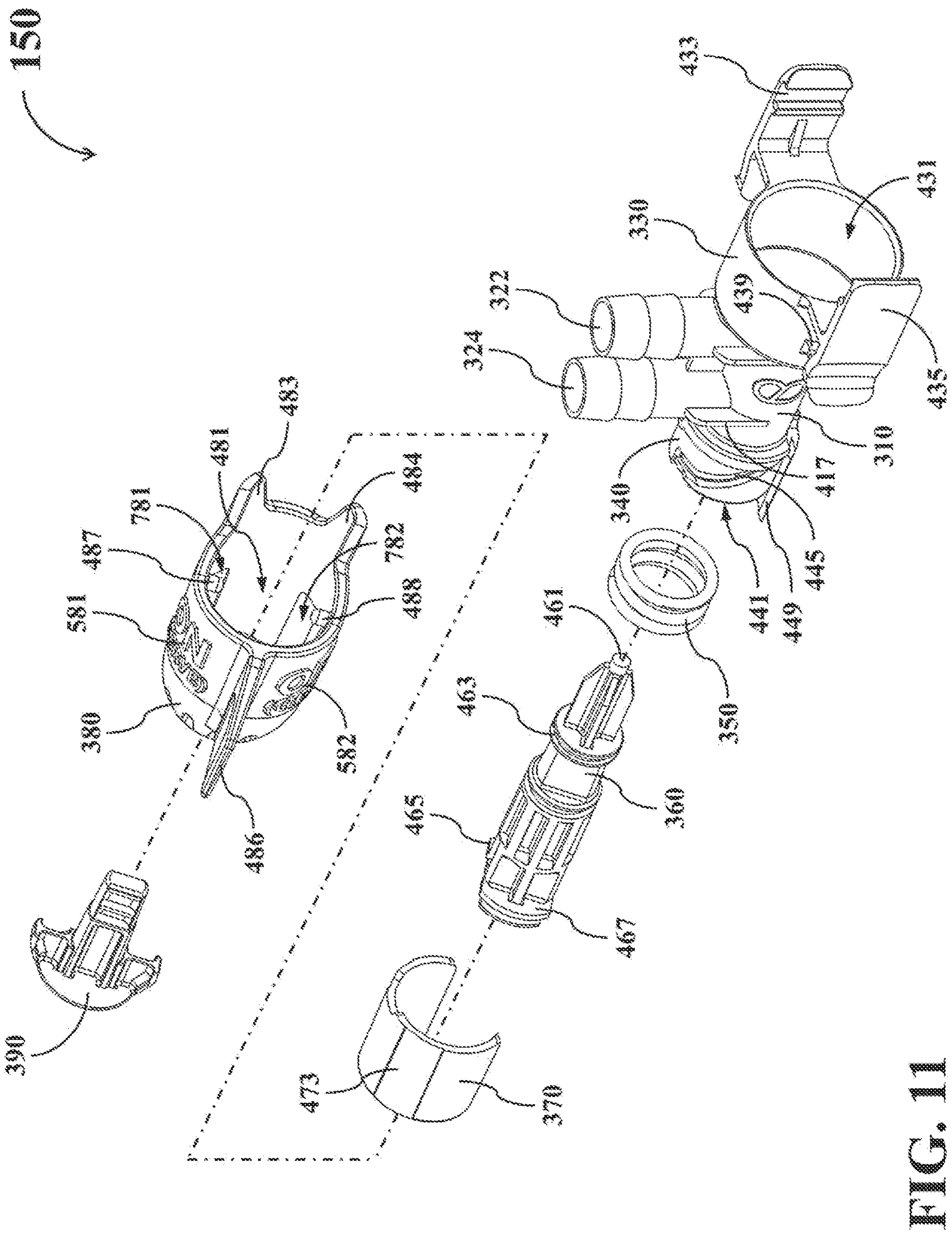

FIG. 4 and FIG. 5 show simplified schematic diagrams of the dual-mode fluid connector 150 operating in the serve mode from different viewing angles. FIG. 6 shows a schematic top view diagram of the dual-mode fluid connector 150 operating in the serve mode. FIG. 7 shows a schematic side view diagram of the dual-mode fluid connector 150 operating in the serve mode. FIG. 8 shows a simplified schematic side view diagram of the dual-mode fluid connector 150 of FIG. 7. FIG. 9 shows a schematic cross-sectional diagram of the dual-mode fluid connector 150 along the direction A-A' of FIG. 6. FIGS. 10~11 show simplified schematic decomposed diagrams of the dual-mode fluid connector 150 from different viewing angles. FIGS. 12~17 show schematic diagrams of assembly process of the dual-mode fluid connector 150 from different viewing angles.

As shown in FIG. 4 through FIG. 17, the dual-mode fluid connector 150 further comprises a rear portion 340, a spring 350, a rod 360, and a bended plate 370. To simplify the drawings, the rod 360, the bended plate 370, and the rotatable element 380 of the dual-mode fluid connector 150 are omitted in the aforementioned FIG. 8 and FIG. 9.

Figure 18:
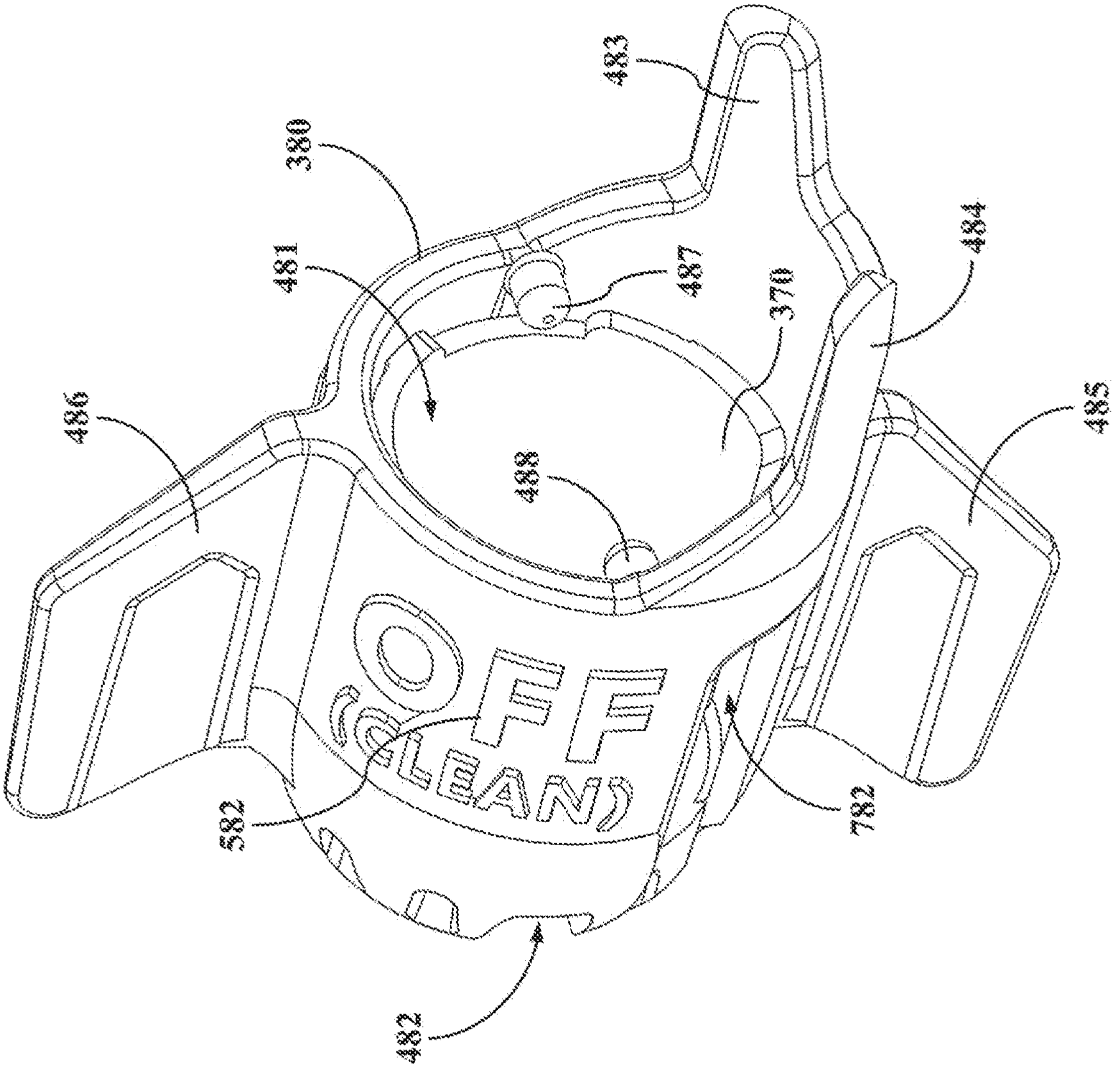
FIGS. 18~19 show schematic assembled diagrams of a rotatable element and a bended plate from different viewing angles according to one embodiment of the present disclosure.
Figure 19:
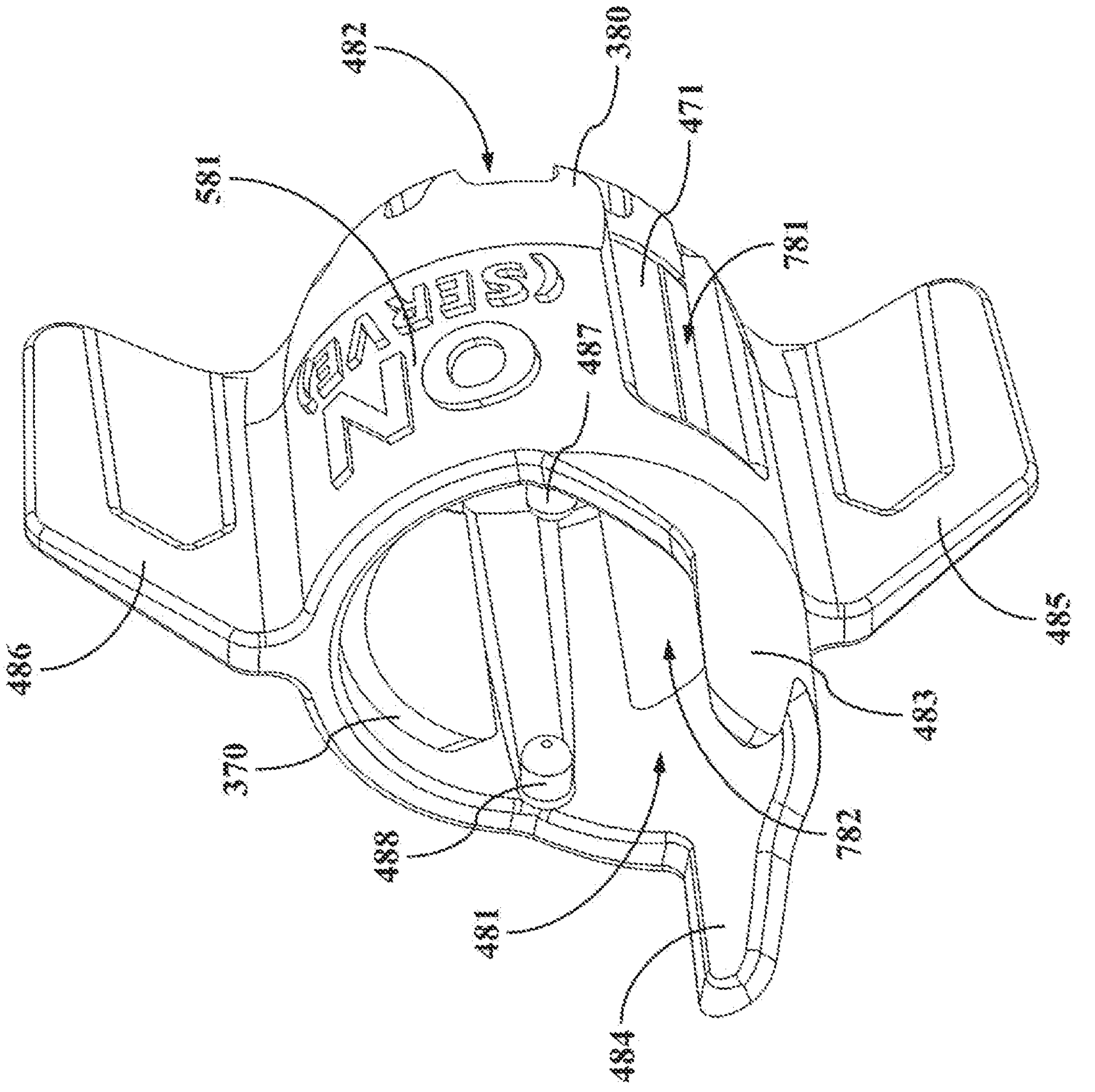
Figure 20:
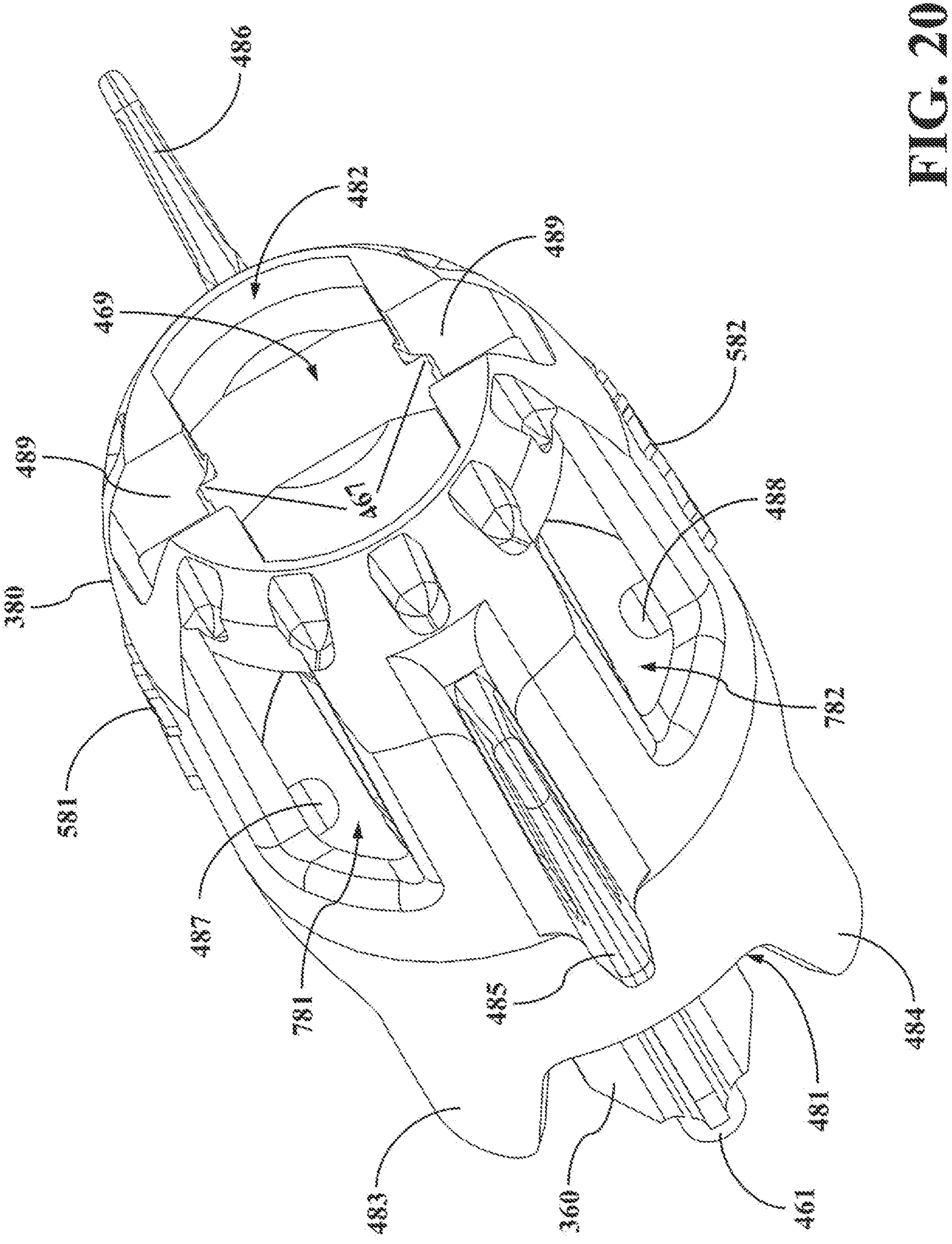
FIG. 20 shows a schematic assembled diagram of the rotatable element and a rod from a first viewing angle according to one embodiment of the present disclosure.
Figure 21:
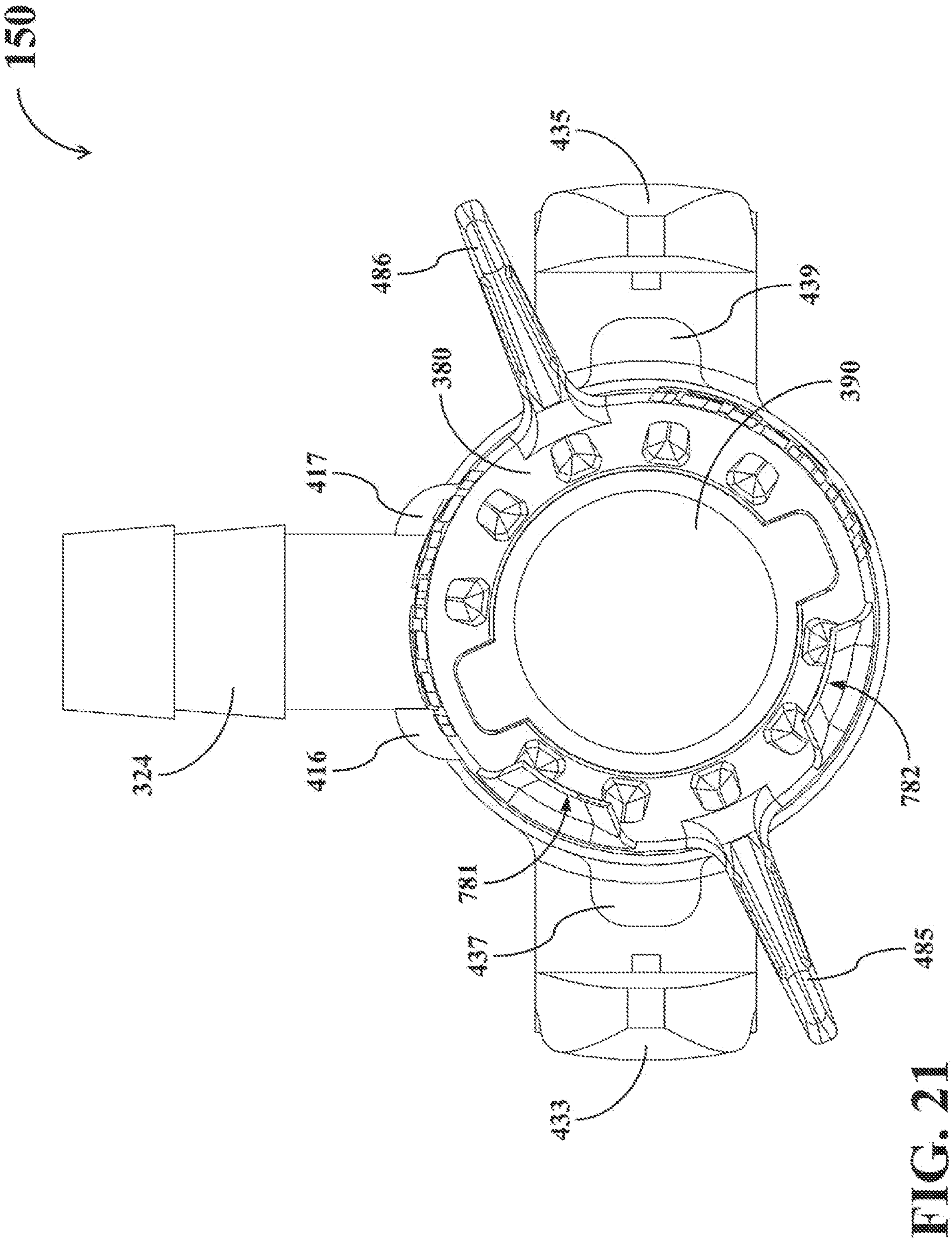
FIG. 21 shows a schematic rear view diagram of the dual-mode fluid connector operating in the serve mode according to one embodiment of the present disclosure.

FIGS. 18~19 show schematic assembled diagrams of the rotatable element 380 and the bended plate 370 from different viewing angles according to one embodiment of the present disclosure. FIG. 20 shows a schematic assembled diagram of the rotatable element 380 and the rod 360 from a first viewing angle according to one embodiment of the present disclosure. FIG. 21 shows a schematic rear view diagram of the dual-mode fluid connector 150 operating in the serve mode according to one embodiment of the present disclosure. To simplify the drawings, the components except for the rotatable element 380 and the bended plate 370 are omitted in FIG. 18 and FIG. 19, and the components except for the rotatable element 380 and the rod 360 are omitted in FIG. 20.

In this embodiment, the hollow connecting element 310 comprises a chamber 411, a block element 415, a first restriction element 416, and a second restriction element 417. As shown in FIG. 9, the chamber 411 is a hollow portion positioned inside the hollow connecting element 310 and penetrating the hollow connecting element 310. The block element 415 is a protuberant structure positioned on an inner surface of the chamber 411, and the block element 415 may divide an interior space of the chamber 411 into a first space 412 and a second space 413.

In addition, it is clearly shown in FIG. 9 that the material tube 322 and the cleaning tube 324 positioned on the hollow connecting element 310 are both connected to the chamber 411. In this embodiment, the material tube 322 is connected to the first space 412 within the chamber 411, and the cleaning tube 324 is connected to the second space 413 within the chamber 411.

The aforementioned block element 415 per se does not isolate or block the transmission channel between the first space 412 and the second space 413. Therefore, when the transmission channel between the first space 412 and the second space 413 is not isolated or blocked by other components, the first space 412 and the second space 413 can be connected to each other, and the first space 412 and the cleaning tube 324 can also be connected to each other through the second space 413 in this situation. In practice, the block element 415 may be realized with a single ring-shaped element or may be realized with multiple separated protruding structures.

As shown in FIG. 4 through FIG. 6, the first restriction element 416 and a second restriction element 417 are respectively extended outward from an outer surface of the hollow connecting element 310 and respectively positioned on two opposite sides of the cleaning tube 324. In this embodiment, the first restriction element 416 and the second restriction element 417 also act as reinforced ribs positioned on both sides of the cleaning tube 324, and can be utilized to improve the structural strength of the cleaning tube 324 and to reduce the possibility of damage to the cleaning tube 324. Similarly, two reinforced ribs having similar structure to the first restriction element 416 and the second restriction element 417 are respectively arranged on both sides of the material tube 322 to improve the structural strength of the material tube 322 and to reduce the possibility of damage to the material tube 322.

The head portion 330 further comprises a first protruding element 437, and a second protruding element 439. As shown in FIG. 4 through FIG. 6, the first protruding element 437 and the second protruding element 439 are respectively extended outward from the outer surface of the head portion 330, wherein the first protruding element 437 is positioned near a rear portion of the first clamp element 433, and the second protruding element 439 is positioned near a rear portion of the second clamp element 435. In general situations, the first protruding element 437 does not touch the first clamp element 433, and the second protruding element 439 does not touch the second clamp element 435.

When the user wants to connect the dual-mode fluid connector 150 to the outlet check valve 140 of the material container 130, the user may press the rear portion of the first clamp element 433 and the rear portion of the second clamp element 435 to slightly open the front sections of both the first clamp element 433 and the second clamp element 435, and then sleeve the head portion 330 of the dual-mode fluid connector 150 onto the outlet check valve 140. In this embodiment, the caliber of the connecting opening 431 of the head portion 330 is larger than the caliber of the output terminal of the outlet check valve 140, thus the outlet check valve 140 will be inserted into the connecting opening 431 when the head portion 330 is sleeved onto the outlet check valve 140. When the outlet check valve 140 is inserted into the connecting opening 431 for an appropriate distance, the first clamp element 433 and the second clamp element 435 will be aligned with the protruding portion 244 of the outlet check valve 140. In this situation, the user may stop pressing the rear portion of the first clamp element 433 and the rear portion of the second clamp element 435, so that the first clamp element 433 and the second clamp element 435 engage with the protruding portion 244 of the outlet check valve 140, thereby improving the connection stability between the dual-mode fluid connector 150 and the outlet check valve 140.

The aforementioned first protruding element 437 and second protruding element 439 may be utilized to limit the degree of deformation of the rear portions of both the first clamp element 433 and the second clamp element 435, so as to prevent the user from pressing too hard on the rear portions of both the first clamp element 433 and the second clamp element 435. In this way, the possibility of elastic fatigue or damage to the first clamp element 433 and the second clamp element 435 can be reduced.

As shown in FIG. 8 through FIG. 11, the rear portion 340 is positioned on another terminal of the hollow connecting element 310. In this embodiment, the rear portion 340 comprises a through hole 441, a first spiral track 443, a second spiral track 445, a block wall portion 447, and one or more rear-portion restriction elements 449. The first spiral track 443 and the second spiral track 445 are arranged on the outer surface of the rear portion 340, and the block wall portion 447 is positioned on one side of the end section of the first spiral track 443. In practice, the block wall portion 447 may be realized with a structure protruding upward from one side of the end section of the first spiral track 443. In addition, the rear portion 340 of this embodiment comprises two rear-portion restriction elements 449, which are respectively realized with two protruding structures extended backward from the end section of the rear portion 340. In practice, the two rear-portion restriction elements 449 may be instead realized with a single protruding structure. In other words, the rear portion 340 may comprise only one rear-portion restriction element 449.

The rod 360 comprises a rod head 461, a sealing portion 463, an outer flange 465, an outer flange 467, and a slot 469. As shown in FIG. 10 through FIG. 17, the rod head 461 is positioned on the front terminal of the rod 360, and the sealing portion 463 protrudes outward from an outer surface of the rod 360. In practice, the sealing portion 463 may be realized with a ring-shaped protruding structure, and the rod 360 or a portion of the sealing portion 463 may be made by slightly elastic materials, so as to improve the liquid tightness between the sealing portion 463 and other components when the sealing portion 463 abuts other components.

The outer flange 465 and the outer flange 467 are positioned near the rear portion of the rod 360 and respectively extended outward toward opposite directions. The slot 469 may be realized with a gap between the outer flange 465 and the outer flange 467 or may be realized with a grooved structure. In this embodiment, the shape of the slot 469 is configured to operably match the shape of the plug 390, so that the plug 390 can be inserted into the slot 469.

Figure 12:
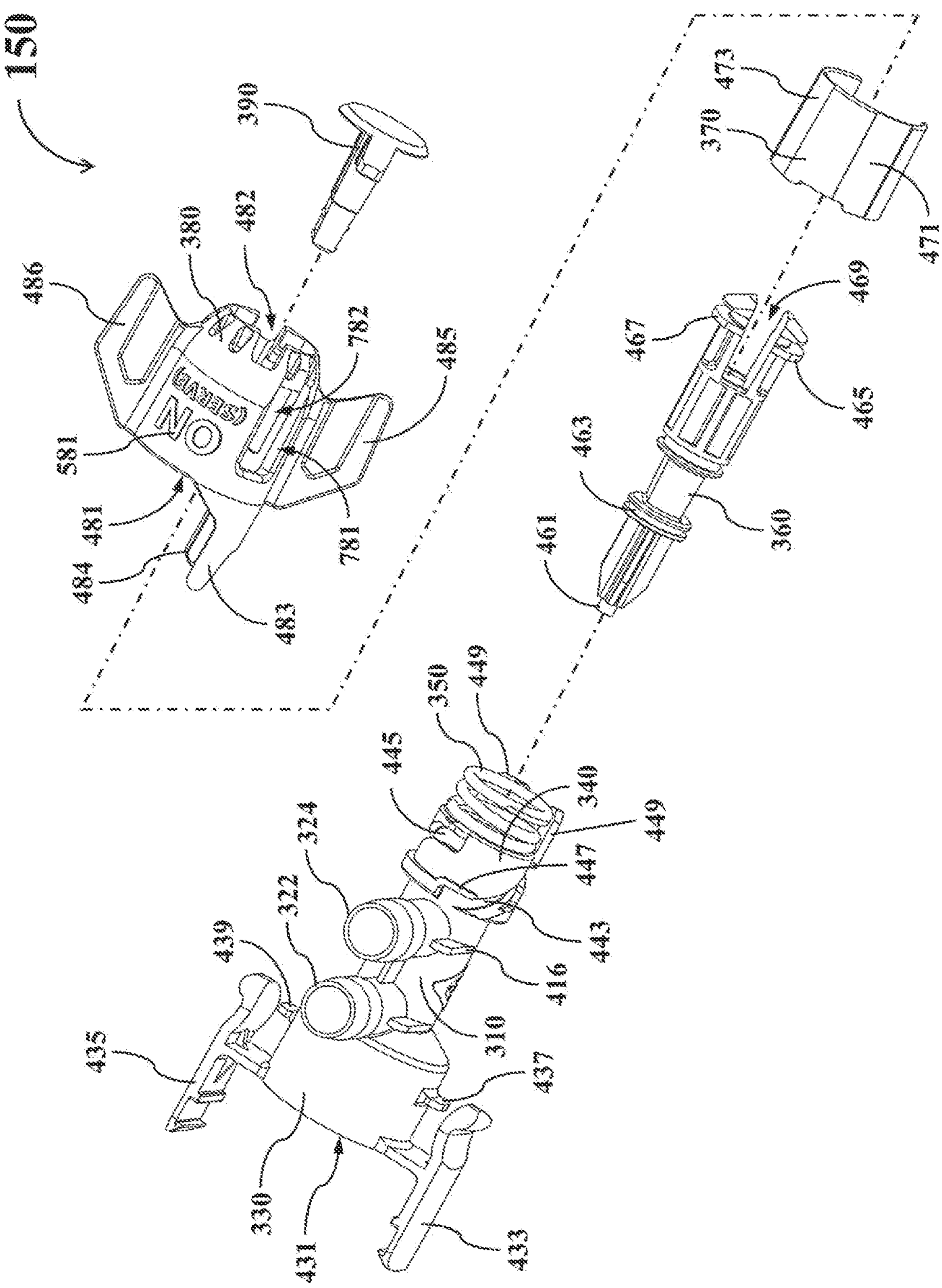
FIGS. 12~17 show schematic diagrams of assembly process of the dual-mode fluid connector from different viewing angles according to one embodiment of the present disclosure.
Figure 13:
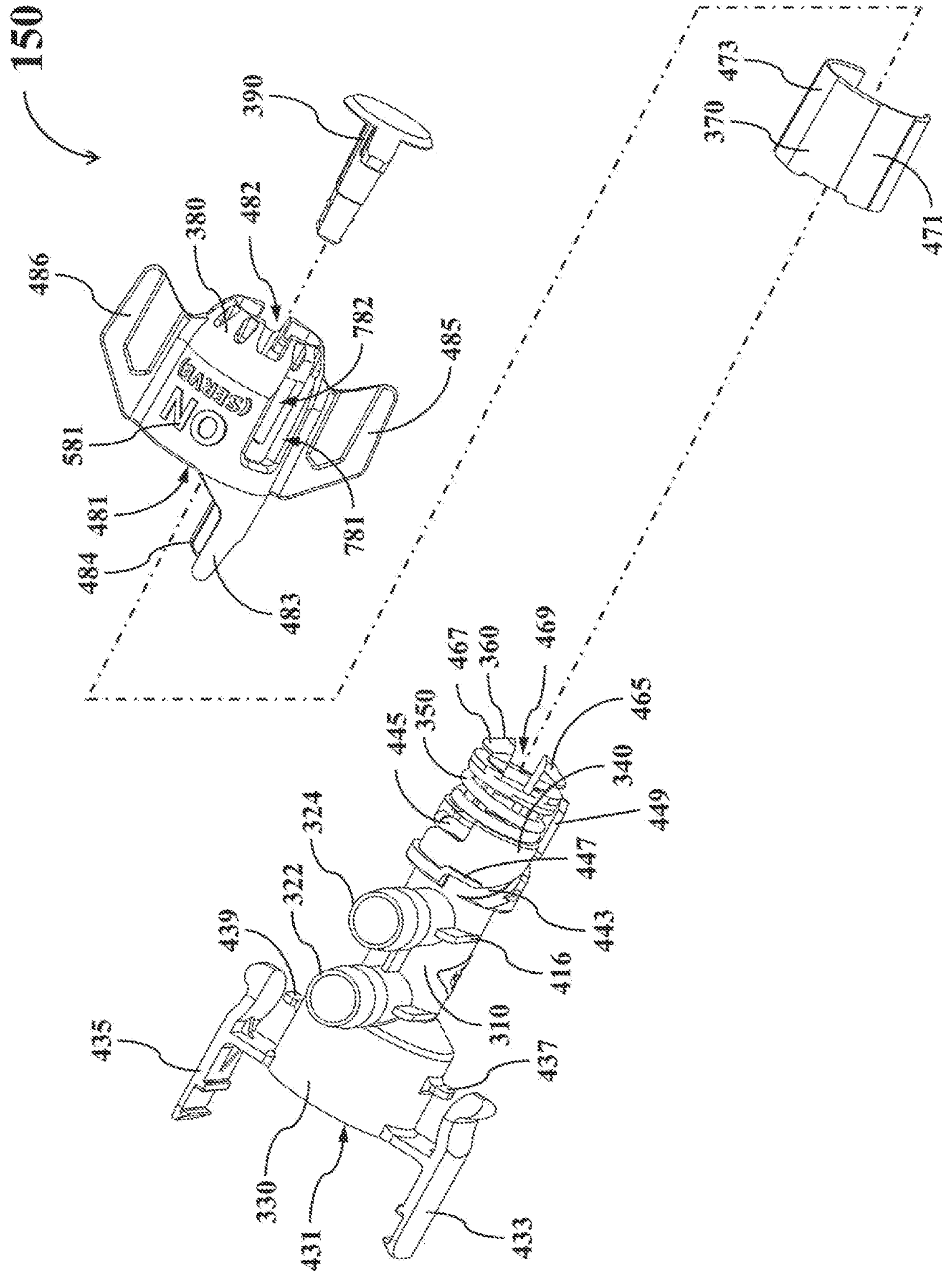
Figure 14:
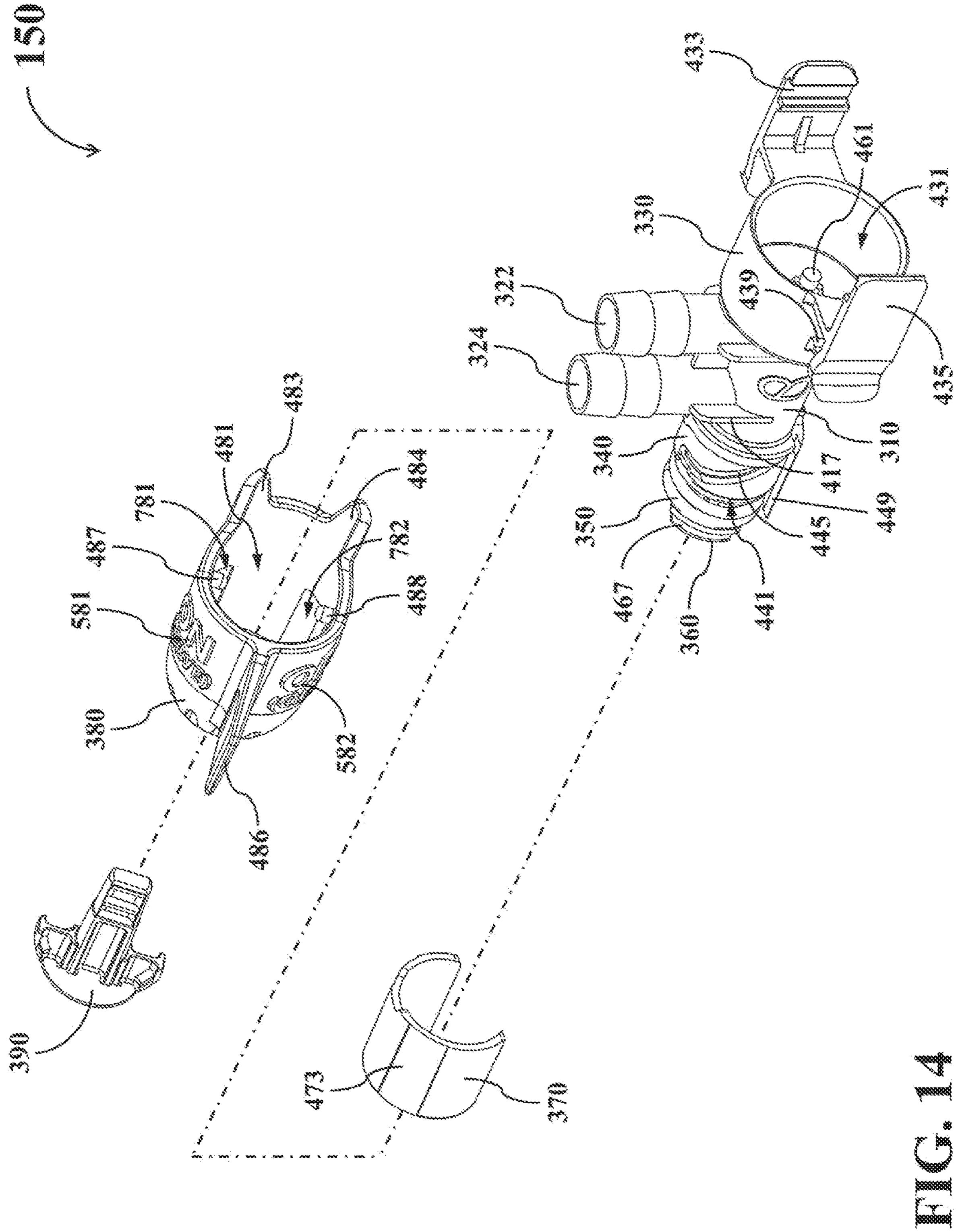
Figure 15:
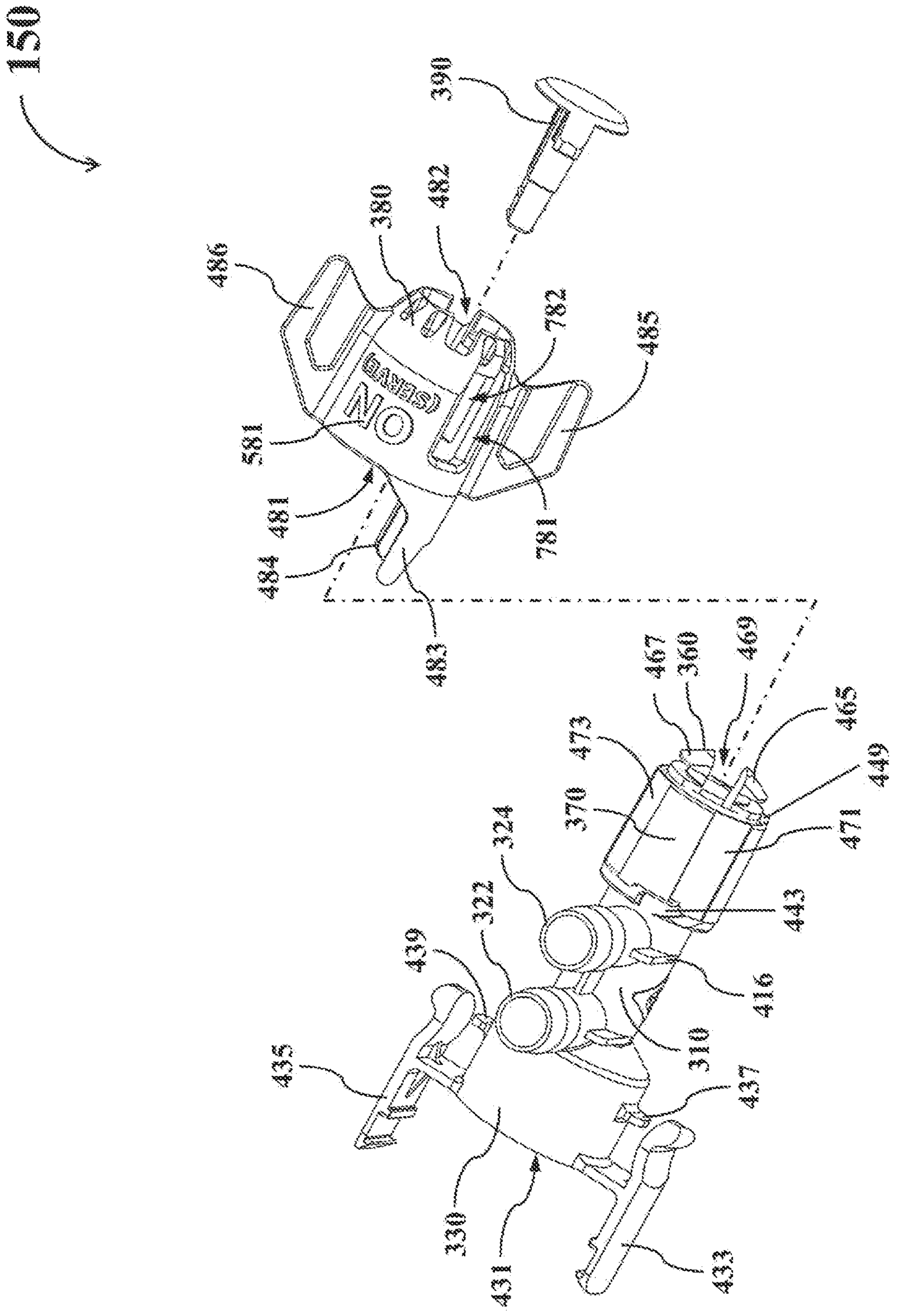
Figure 16:
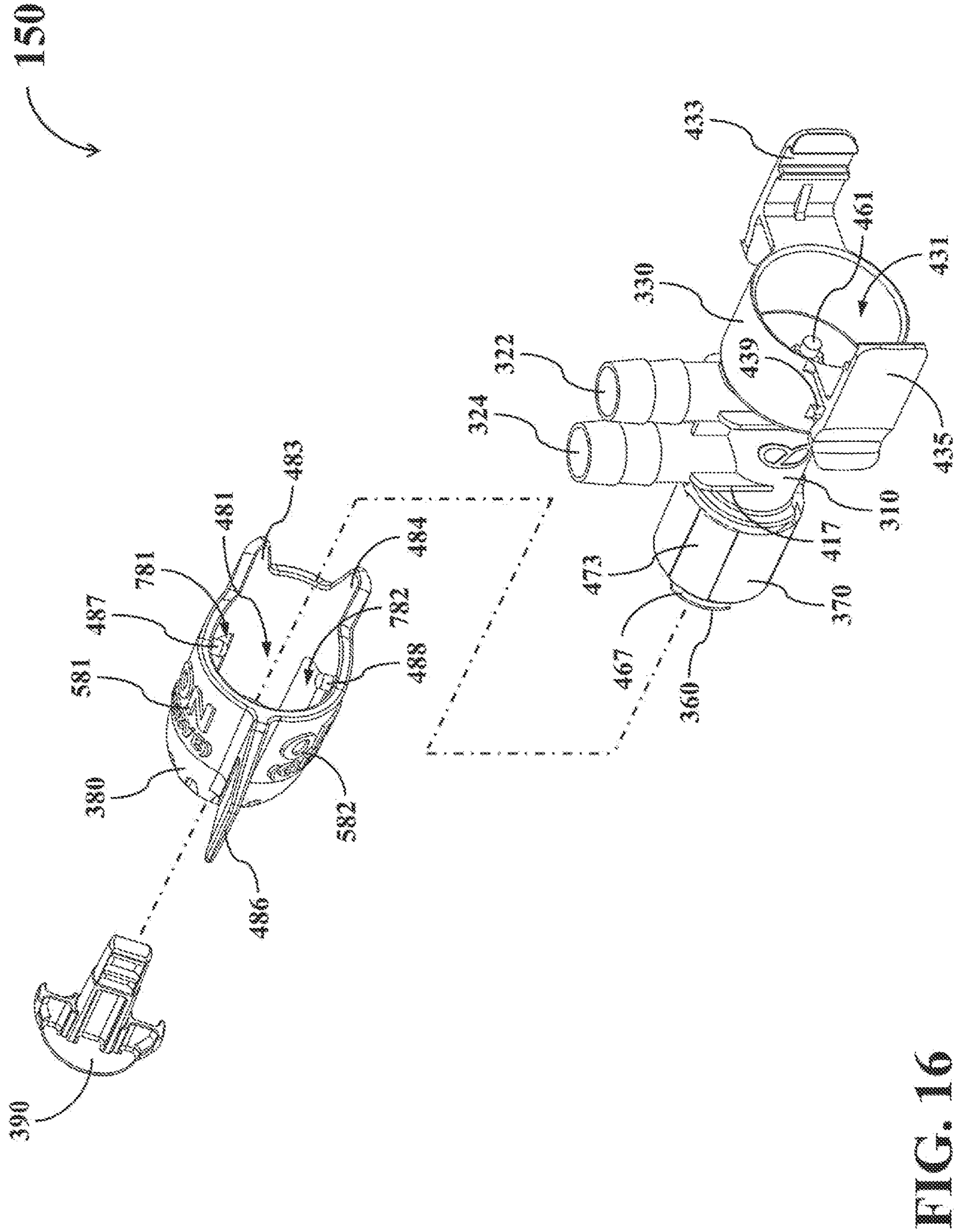

The spring 350 is positioned next to the through hole 441 of the rear portion 340. As shown in FIG. 12 through FIG. 14, the rod 360 can be inserted into the chamber 411 of the hollow connecting element 310 through the through hole 441 of the rear portion 340. In some embodiments, the spring 350 is positioned between the rear portion 340 and the outer flange 465 and outer flange 467 of the rod 360 after the rod 360 is inserted into the chamber 411. In this situation, when the rod 360 is moved toward the head portion 330 for a certain distance, the outer flange 465 and the outer flange 467 will engage and compress the spring 350.

The bended plate 370 comprises a first marked region 471 and a second marked region 473, wherein the first marked region 471 and the second marked region 473 are partial regions respectively positioned on different positions of the outer surface of the bended plate 370. In this embodiment, the bended plate 370 has a C-shaped appearance from the front view or the rear view of the bended plate 370. When the bended plate 370 is sleeved onto the rear portion 340, two sides of the bended plate 370 abut the outside of the rear-portion restriction element 449 of the rear portion 340 to prevent the bended plate 370 from rotation. As shown in FIG. 4, FIG. 7, and FIG. 10 through FIG. 17, the bended plate 370 is positioned between the rotatable element 380 and the rear portion 340.

In practice, different indication colors, different images, different indication texts, and/or different indication symbols may be respectively arranged on the first marked region 471 and the second marked region 473 to indicate different operation modes of the dual-mode fluid connector 150. For example, the first marked region 471 may be filled in with a first color (e.g., blue, green, purple, or the like) for representing the serve mode, and the second marked region 473 may be filled in with a second color (e.g., yellow, orange, red, or the like) for representing the clean mode. Please note that the aforementioned combinations of colors are merely some embodiments, rather than restrictions to the practical implementations.

For another example, a first image for representing the serve mode may be arranged on the first marked region 471, and a second image for representing the clean mode may be arranged on the second marked region 473.

For yet another example, a first text or letter for representing the serve mode may be arranged on the first marked region 471, and a second text or letter for representing the clean mode may be arranged on the second marked region 473.

The rotatable element 380 comprises a front opening 481, a rear opening 482, a first elongated portion 483, a second elongated portion 484, a first fin 485, a second fin 486, a first guiding element 487, a second guiding element 488, a block portion 489, a first area 581, a second area 582, a first window 781, and a second window 782.

As shown in FIG. 4 through FIG. 7 and FIG. 10 through FIG. 11, when the rotatable element 380 is sleeved onto the rear portion 340, the rotatable element 380 is positioned outside the rear portion 340, covering the rear portion 340, and engages with the rod 360. The front opening 481 of the rotatable element 380 may cover portion or all of the rear portion 340, while the rear opening 482 of the rotatable element 380 allows the plug 390 to insert therethrough.

When the rotatable element 380 is sleeved onto the rear portion 340, the user may utilize the rear portion 340 (or the rod 360) as a rotation axis and rotate the rotatable element 380 clockwise or counterclockwise around the rotation axis.

As shown in FIG. 4 through FIG. 7 and FIG. 10 through FIG. 19, when the rotatable element 380 is sleeved onto the rear portion 340, the bended plate 370 is positioned between the inner surface of the rotatable element 380 and the outer surface of the rear portion 340.

The first elongated portion 483 and the second elongated portion 484 are respectively extended from an edge of the front opening 481 toward the head portion 330. The first elongated portion 483 should has a sufficient length so that the aforementioned first restriction element 416 can block the side of the first elongated portion 483 when the rotatable element 380 rotates to a certain angle. The second elongated portion 484 should has a sufficient length so that the aforementioned second restriction element 417 can block the side of the second elongated portion 484 when the rotatable element 380 rotates to a certain angle. In practice, the lengths and shapes of the first elongated portion 483 and the second elongated portion 484 may be designed to be various patterns capable of realizing the above functionalities, rather than being restricted to the embodiment shown in FIG. 4, FIG. 7, FIG. 18, and FIG. 19.

The first fin 485 and the second fin 486 are respectively positioned on two opposite sides of the outer surface of the rotatable element 380, and can be utilized to facilitate the user to rotate the rotatable element 380. The functionality of the first fin 485 and the second fin 486 is to increase the leverage effect when the user rotates the rotatable element 380. In practice, the positions, shapes, and sizes of the first fin 485 and the second fin 486 may be designed to be various patterns capable of supporting the user to rotate the rotatable element 380, rather than being restricted to the embodiment shown in FIG. 4, FIG. 6, and FIG. 10 through FIG. 21.

The first guiding element 487 and the second guiding element 488 are respectively positioned on different positions of the inner surface of the rotatable element 380. In practice, the first guiding element 487 may be realized with various protruding structures whose shapes can match the aforementioned first spiral track 443, while the second guiding element 488 may be realized with various protruding structures whose shapes can match the aforementioned second spiral track 445. As shown in FIG. 10 through FIG. 20, the first guiding element 487 and the second guiding element 488 are respectively positioned on two opposite sides of the inner surface of the rotatable element 380 in this embodiment.

As can be appreciated from the foregoing descriptions, when the rotatable element 380 is sleeved onto the rear portion 340, the user can utilize the rear portion 340 (or the rod 360) as the rotation axis and rotate the rotatable element 380 around the rotation axis. In this situation, the first guiding element 487 engages with the first spiral track 443 and can be moved along the first spiral track 443, while the second guiding element 488 engages with the second spiral track 445 and can be moved along the second spiral track 445. In this embodiment, since the first spiral track 443 and the second spiral track 445 are spiral, when the rotatable element 380 is rotated by the user, the rotatable element 380 will move forward while rotating or move backward while rotating due to the cooperation of the first guiding element 487, the second guiding element 488, the first spiral track 443, and the second spiral track 445.

The block portion 489 is positioned in the interior of the rotatable element 380, and when the rotatable element 380 is sleeved onto the rear portion 340, the block portion 489 may engage with the outer flange 465 and the outer flange 467 of the rod 360 and can prevent the outer flange 465 and the outer flange 467 from penetrating the rear opening 482 of the rotatable element 380. As shown in FIG. 20, in this embodiment, when the rotatable element 380 and the rod 360 are assembled together, the outer flange 465 and the outer flange 467 positioned near the rear portion of the rod 360 will be blocked by the block portion 489 of the rotatable element 380, thereby preventing the rod 360 from detaching from the rotatable element 380 through the rear opening 482.

The block portion 489 also drives the outer flange 465 and the outer flange 467 to rotate together. Therefore, when the rotatable element 380 is rotated by the user, the rotatable element 380 not only moves forward while rotating or moves backward while rotating due to the aforementioned cooperation of the first guiding element 487, the second guiding element 488, the first spiral track 443, and the second spiral track 445, but also drives the rod 360 to rotate together and to move forward or backward together.

Figure 17:
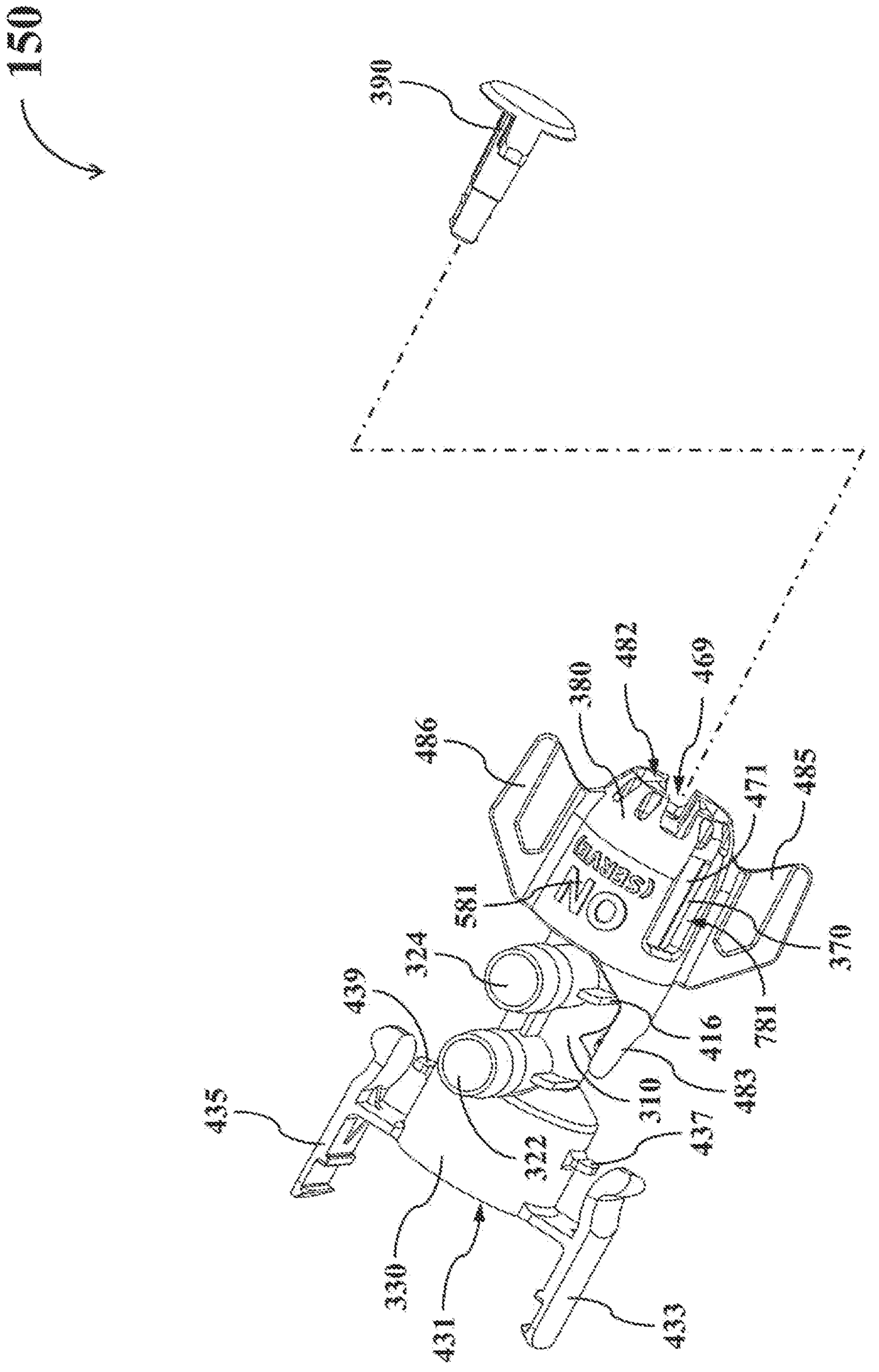

Additionally, as shown in FIG. 17, when assembling the dual-mode fluid connector 150, the plug 390 may be inserted into the rotatable element 380 through the rear opening 482 of the rotatable element 380 and plugged in the slot 469 between the outer flange 465 and the outer flange 467 of the rod 360. In this situation, the plug 390 slightly squeezes the outer flange 465 and the outer flange 467 outward, so that the outer flange 465 and the outer flange 467 are more tightly pressed against the block portion 489. Therefore, the plug 390 plugged into the slot 469 not only prevents the outer flange 465 and the outer flange 467 from detaching from the block portion 489, but also further improves the connection stability between the rotatable element 380 and the rod 360.

In some embodiments, the spring 350 is positioned between the rear portion 340 and the block portion 489 in the interior of the rotatable element 380 after the rotatable element 380 is sleeved onto the rear portion 340. In this situation, when the rotatable element 380 is moved toward the head portion 330 for a certain distance, the block portion 489 will engage and compress the spring 350.

The first area 581 and the second area 582 are respectively positioned on two opposite sides of the outer surface of the rotatable element 380. In practice, different indication texts, different indication symbols, different images, and/or different indication colors may be respectively arranged on the first area 581 and the second area 582 to indicate different operation modes of the dual-mode fluid connector 150.

In this embodiment, the first area 581 and the second area 582 are respectively positioned on two opposite sides of the outer surface of the rotatable element 380. The indication texts "ON" and "SERVE" for representing the serve mode are arranged on the first area 581, and the indication texts "OFF" and "CLEAN" for representing the clean mode are arranged on the second area 582. When the rotatable element 380 is rotated to a status where the first area 581 faces upward, it represents that the dual-mode fluid connector 150 is switched to the serve mode. When the rotatable element 380 is rotated to a status where the second area 582 faces upward, it represents that the dual-mode fluid connector 150 is switched to the clean mode. Please note that the aforementioned combinations of texts are merely some embodiments, rather than restrictions to the practical implementations.

For example, a first symbol (or a first group of symbols) for representing the serve mode may be arranged in the first area 581, and a second symbol (or a second group of symbols) for representing the clean mode may be arranged in the second area 582.

For another example, a first color (e.g., blue, green, purple, or the like) for representing the serve mode may be filled in part or all of the first area 581, and a second color (e.g., yellow, orange, red, or the like) for representing the clean mode may be filled in part or all of the second area 582.

The first window 781 and the second window 782 are respectively positioned on different portions of the rotatable element 380. In practice, each of the first window 781 and the second window 782 may be realized with an opening or a notch with appropriate shape and size. In this embodiment, for example, the first window 781 and the second window 782 are realized with openings respectively located near the left side and the right side of the first fin 485 as shown FIG. 7 and FIG. 20.

As can be appreciated from the foregoing descriptions, the bended plate 370 is positioned between the inner surface of the rotatable element 380 and the outer surface of the rear portion 340 when the dual-mode fluid connector 150 is completely assembled. Therefore, a part of the outer surface of the bended plate 370 is exposed from the first window 781 and/or the second window 782 so that the user can see the part of the outer surface of the bended plate 370 through the first window 781 and/or the second window 782.

In addition, when the rotating direction and rotating angle of the rotatable element 380 vary, different area of the outer surface of the bended plate 370 will be exposed from the first window 781 and/or the second window 782.

In this embodiment, for example, when the user rotates the rotatable element 380 to a status where the first window 781 faces upward, the first marked region 471 of the bended plate 370 will be exposed from the first window 781, and when the user rotates the rotatable element 380 to a status where the second window 782 faces upward, the second marked region 473 of the bended plate 370 will be exposed from the second window 782.

As can be appreciated from the foregoing descriptions, when the dual-mode fluid connector 150 is completely assembled, the spring 350 is positioned between the rear portion 340 and the outer flange 465 and the outer flange 467 of the rod 360, the rod 360 engages with the rotatable element 380, the bended plate 370 is positioned between the rear portion 340 and the rotatable element 380, the rotatable element 380 covers on the rear portion 340 and the bended plate 370, and the plug 390 is plugged into the slot 469 of the rod 360 and engages with the rear opening 482 of the rotatable element 380.

In addition, a part of the outer surface of the bended plate 370 is exposed from the first window 781 and/or the second window 782 of the rotatable element 380. Moreover, when the rotatable element 380 is rotated by the user, the rotatable element 380 drives the rod 360 to rotate together and to move forward or backward together.

The aforementioned hollow connecting element 310, material tube 322, cleaning tube 324, head portion 330, and rear portion 340 collectively form a connector main body of the dual-mode fluid connector 150. In practice, the hollow connecting element 310, the material tube 322, the cleaning tube 324, the head portion 330, and the rear portion 340 may be integrally formed to increase the structural rigidity of the connector main body of the dual-mode fluid connector 150.

As described previously, the dual-mode fluid connector 150 has two operating modes, which are the serve mode and the clean mode. The user (e.g., the cleaner or the operator of the automated beverage preparation apparatus 100) may rotate the rotatable element 380 to easily switch the dual-mode fluid connector 150 between the serve mode and the clean mode.

When the user wants to set the dual-mode fluid connector 150 to the serve mode, the user may rotate the rotatable element 380 toward a first predetermined direction (e.g., a clockwise direction). In this situation, the rotatable element 380 moves forward while rotating and drives the rod 360 to move forward together, so that the sealing portion 463 of the rod 360 abuts the block element 415 in the chamber 411 and causes the rod head 461 to push the stopper 242 of the outlet check valve 140 inward. As described previously, while the rod 360 or the rotatable element 380 moves toward the head portion 330, the outer flange 465 and the outer flange 467 of the rod 360 or the block portion 489 inside the rotatable element 380 compresses the spring 350.

In this embodiment, when the rotatable element 380 is rotated to a status where the first area 581 faces upward, the rod 360 will move forward for a predetermined distance due to the driving of the rotatable element 380, so as to ensure that the cleaning tube 324 and the first space 412 of the chamber 411 will be separated and isolated with each other by the sealing portion 463 and the block element 415, and to ensure that the rod head 461 of the rod 360 pushes the stopper 242 inward for an enough distance to render the output terminal of the outlet check valve 140 to become the open status.

Figure 22:
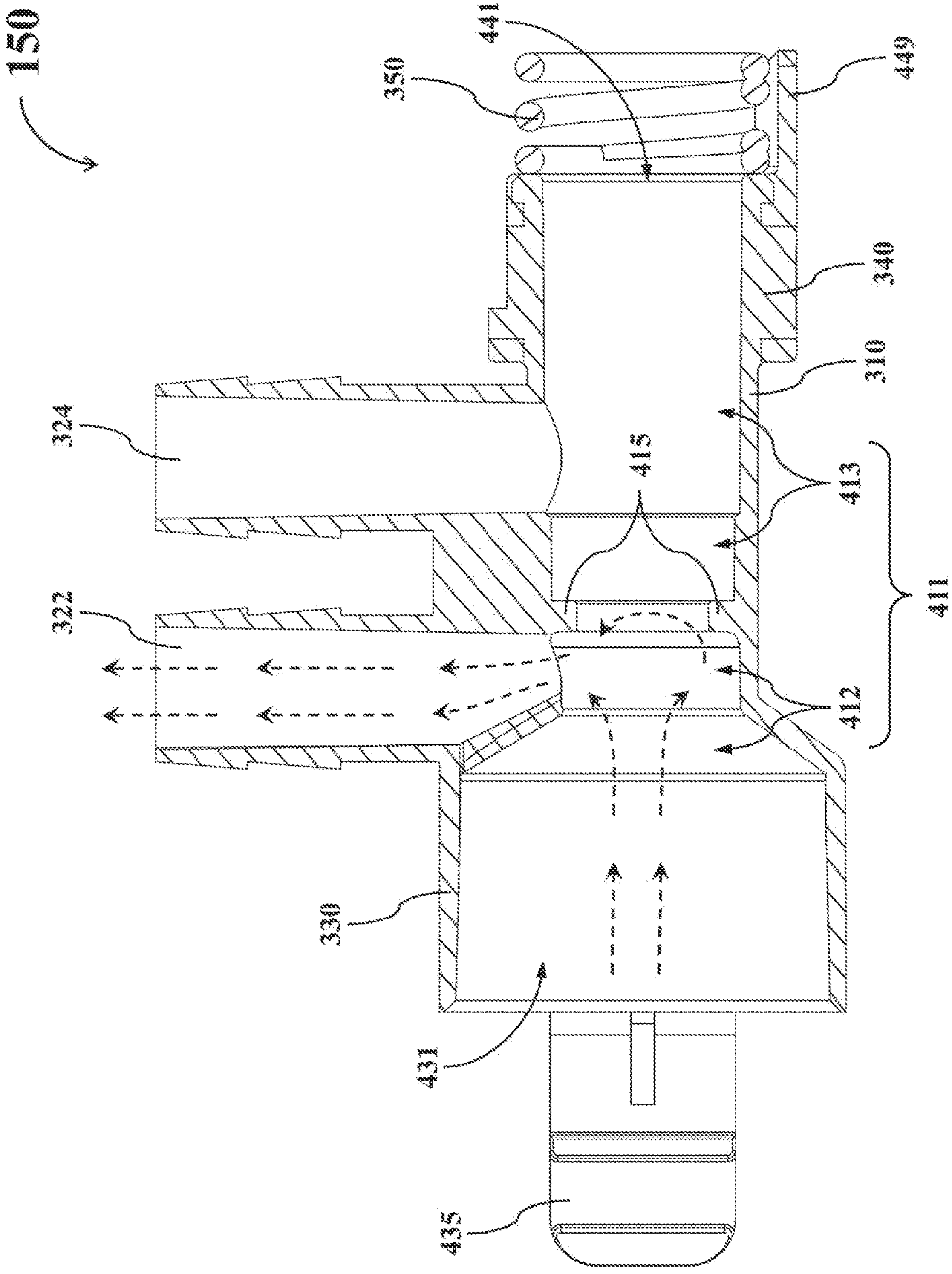
FIG. 22 shows a simplified schematic diagram illustrating the internal liquid flow direction of the dual-mode fluid connector operating in the serve mode according to one embodiment of the present disclosure.

Please refer to FIG. 22, which shows a simplified schematic diagram illustrating the internal liquid flow direction of the dual-mode fluid connector 150 operating in the serve mode according to one embodiment of the present disclosure. The broken lines are utilized to show the possible flow direction of the liquid material in the dual-mode fluid connector 150 in FIG. 22.

As shown in FIG. 22, when the dual-mode fluid connector 150 operates in the serve mode, the liquid materials in the material container 130 is enabled to flow into the first space 412 of the hollow connecting element 310 through the outlet check valve 140, but the liquid materials in the material container 130 cannot flow into the second space 413 of the hollow connecting element 310 due to the blocking of the sealing portion 463 of the rod 360. Therefore, the liquid material received by the dual-mode fluid connector 150 can only flow into the material tube 322 and the tube (not shown in the figures) connected to the material tube 322 through the hollow connecting element 310, but cannot flow into the second space 413 of the chamber 411, the cleaning tube 324, and the tube (not shown in the figures) connected to the cleaning tube 324 through the hollow connecting element 310.

In this situation, even if there is residual detergent in the cleaning tube 324 and the tube connected to the cleaning tube 324, the residual detergent will not contaminate the liquid material in the first space 412 of the hollow connecting element 310, thus the residual detergent will not affect the liquid material output by the material tube 322.

In addition, as described previously, the block wall portion 447 is positioned on the end section of the first spiral track 443 of the rear portion 340. When the rotatable element 380 drives the rod 360 to move forward and renders the sealing portion 463 to abut the block element 415, the first guiding element 487 of the rotatable element 380 will enter the end section of the first spiral track 443 and render the block wall portion 447 to engage with the first guiding element 487. In practice, the end section of the first spiral track 443 may be designed to be a straight track. In this situation, the block wall portion 447 positioned on the end section of the first spiral track 443 has a planar appearance. Since the block wall portion 447 blocks the first guiding element 487, the elastic restoring force of the spring 350 is unable to push the rod 360 backward. Therefore, the presence of the block wall portion 447 can effectively prevent the sealing portion 463 of the rod 360 from detaching from the block element 415 due to the impact of the liquid material. In this way, it can be ensured that when the dual-mode fluid connector 150 operates in the serve mode, the first space 412 and the second space 413 of the chamber 411 can be kept isolated, so as to prevent the liquid material from erroneously flowing into the cleaning tube 324.

On the other hand, when the user rotates the rotatable element 380 toward the aforementioned first predetermined direction to a certain extent, the first elongated portion 483 of the rotatable element 380 will engage with the first restriction element 416 of the hollow connecting element 310 to avoid the rotatable element 380 from continuing to rotate toward the first predetermined direction. Such design can prevent the rotatable element 380 from being over-rotated by the user, thereby preventing the rod 360 from moving forward excessively.

If the rod 360 moves forward excessively, it may cause the sealing portion 463 of the rod 360 to be stuck in the opening formed by the block element 415 or even to penetrate the opening formed by the block element 415. Once the sealing portion 463 of the rod 360 is stuck in the opening formed by the block element 415 or penetrates the opening formed by the block element 415, it may cause malfunction of the dual-mode fluid connector 150 or may cause damage to the sealing portion 463.

Therefore, the cooperation of the aforementioned first elongated portion 483 and first restriction element 416 can effectively restrict the rotation angle of the rotatable element

380, thereby limiting the forward distance of the rod 360. In this way, it can prevent the user's improper manipulation of over-rotating the rotatable element 380, thus reducing the possibility of malfunction of the dual-mode fluid connector 150 or the possibility of damaging the sealing portion 463.

Similar to the traditional beverage preparing machine, the automated beverage preparation apparatus 100 also requires to conduct cleaning procedure, disinfection procedure, and/or sterilization procedure at appropriate time points, so as to prevent the components, tubes, and/or connectors of the automated beverage preparation apparatus 100 from growing bacteria or generating toxins.

As described previously, when cleaning the traditional beverage preparing machine, the cleaner has to manually remove multiple connectors from different material containers one by one and then to manually clean or utilize other assisting equipment to clean the related components, multiple tubes, and multiple connectors. When the cleaning procedure is completed, multiple connectors shall be manually connected between corresponding material containers and tubes by the cleaner one by one. The aforementioned approach of manually removing multiple connectors one by one and finally connecting the multiple connectors back one by one not only consumes a lot of labor time, but also easily makes the surrounding environment dirty during removing the connectors, and usually causes the connectors to be scratched or even damaged.

In order to prevent the aforementioned problems, the dual-mode fluid connector 150 is designed to enable the user to perform the cleaning procedure, disinfection procedure, and/or sterilization procedure on the dual-mode fluid connector 150 and the automated beverage preparation apparatus 100 without removing the dual-mode fluid connector 150 from the outlet check valve 140 of the material container 130.

Figure 23:
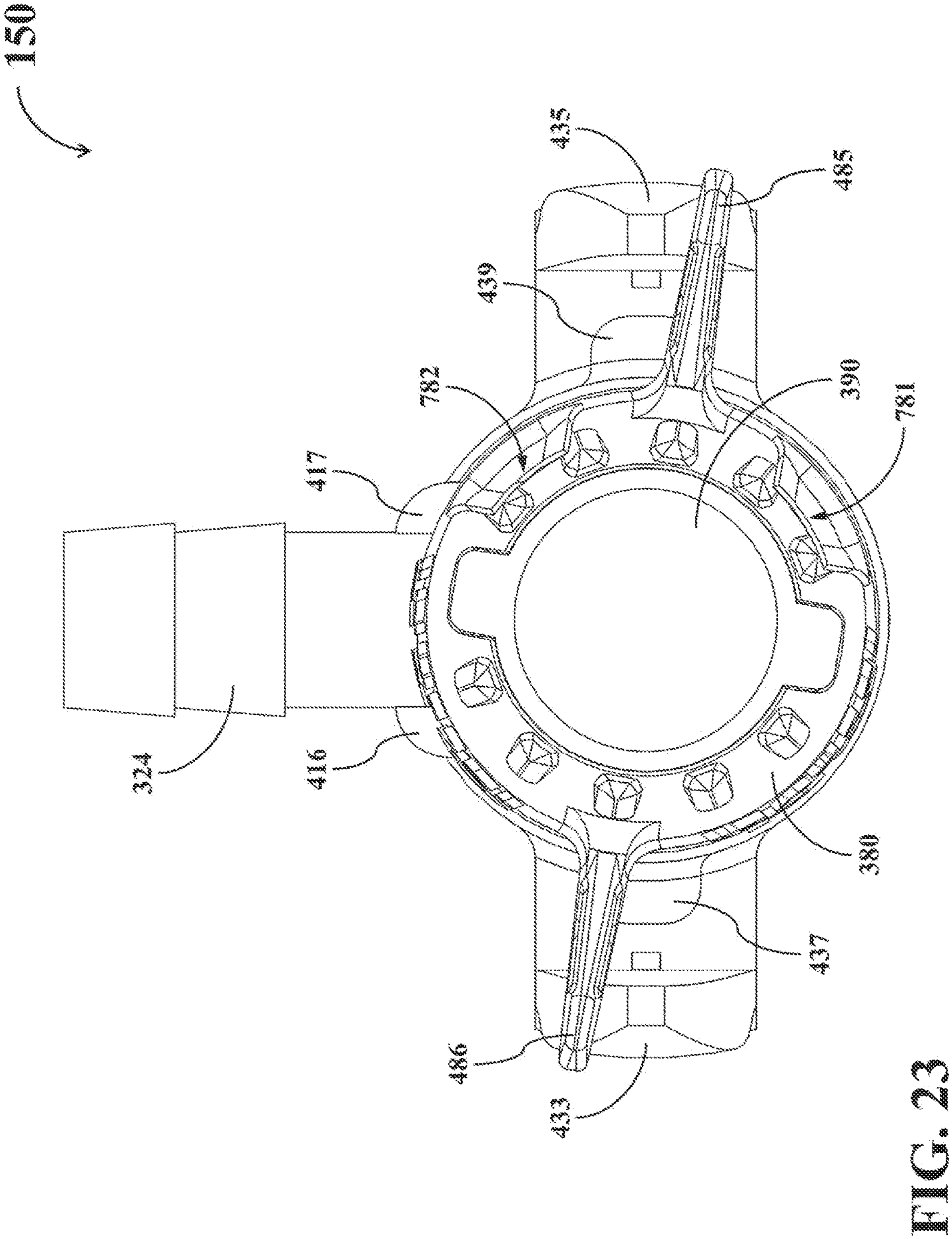
FIG. 23 shows a schematic rear view diagram of the dual-mode fluid connector operating in a clean mode according to one embodiment of the present disclosure.
Figure 24:
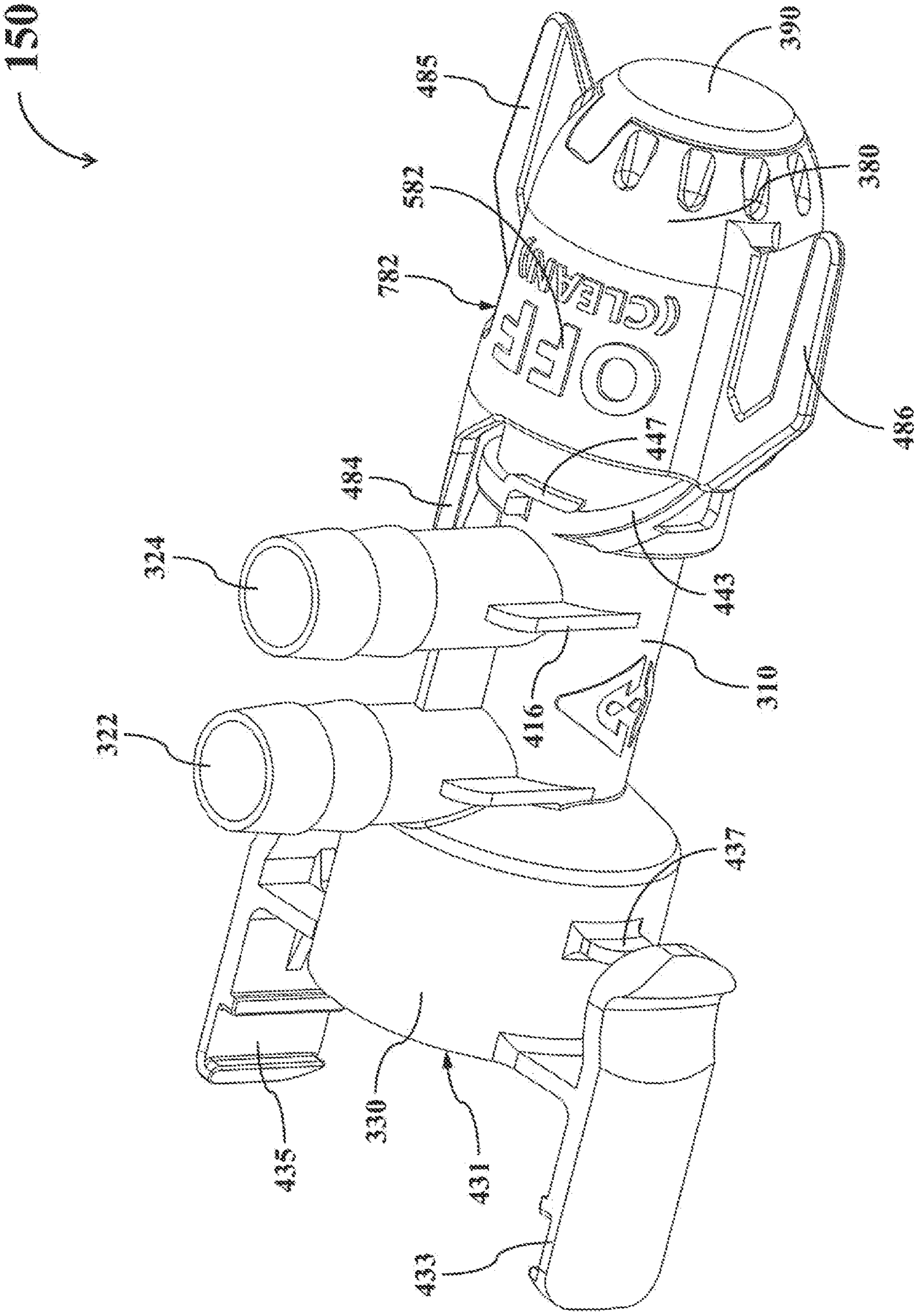
FIG. 24 and FIG. 25 show simplified schematic diagrams of the dual-mode fluid connector operating in the clean mode from different viewing angles according to one embodiment of the present disclosure.
Figure 25:
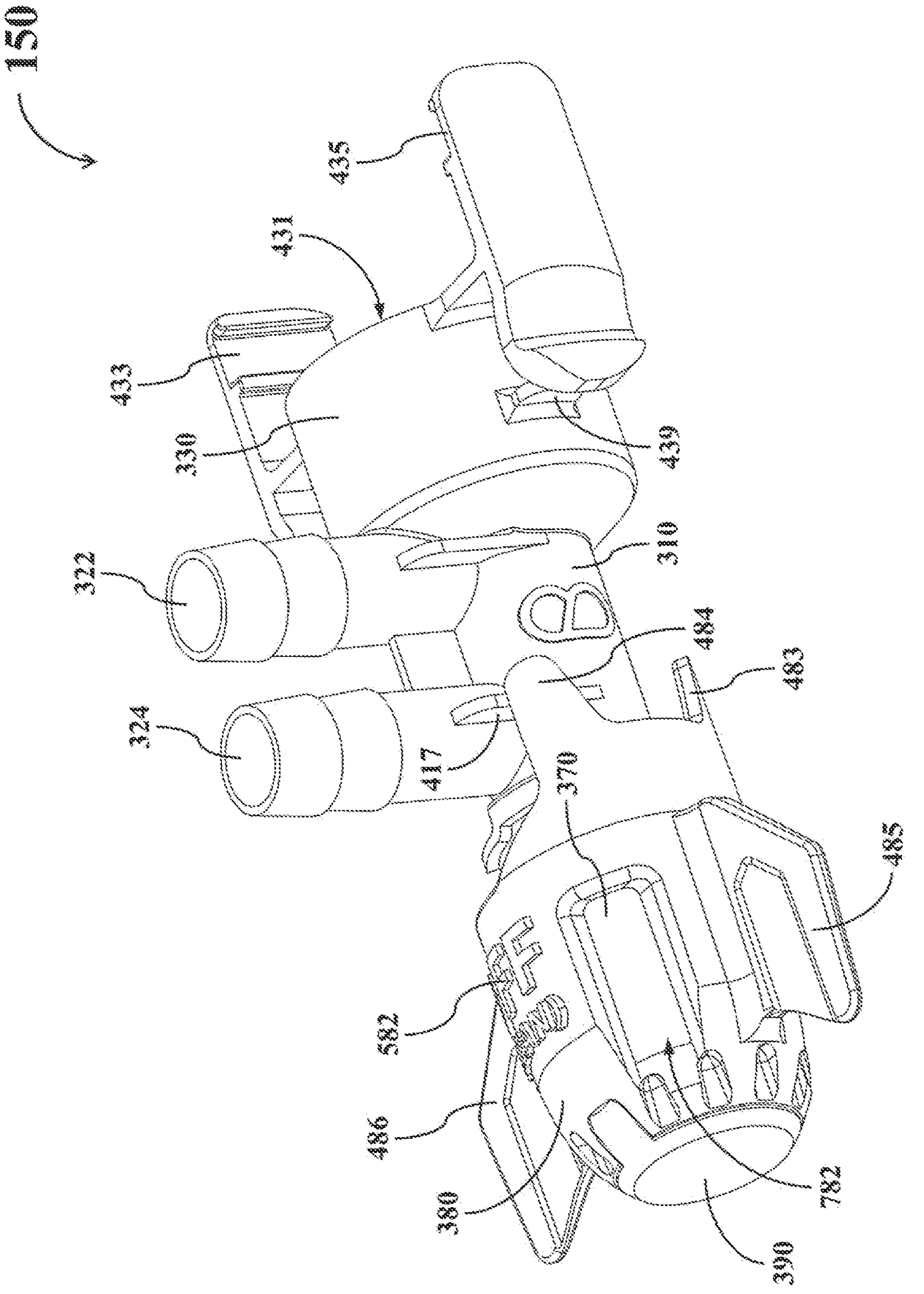
Figure 26:
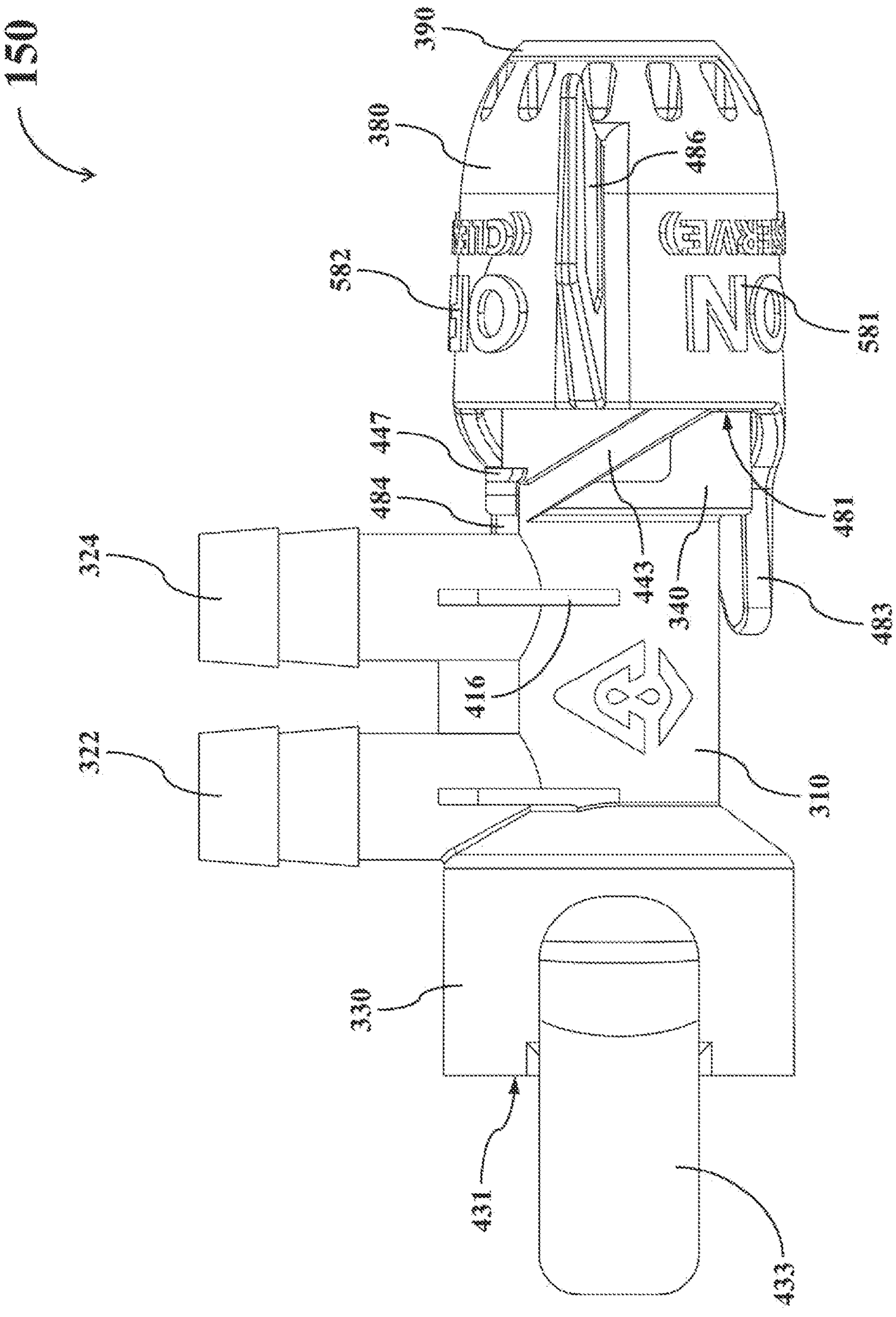
FIG. 26 shows a schematic side view diagram of the dual-mode fluid connector operating in the clean mode according to one embodiment of the present disclosure.
Figure 27:
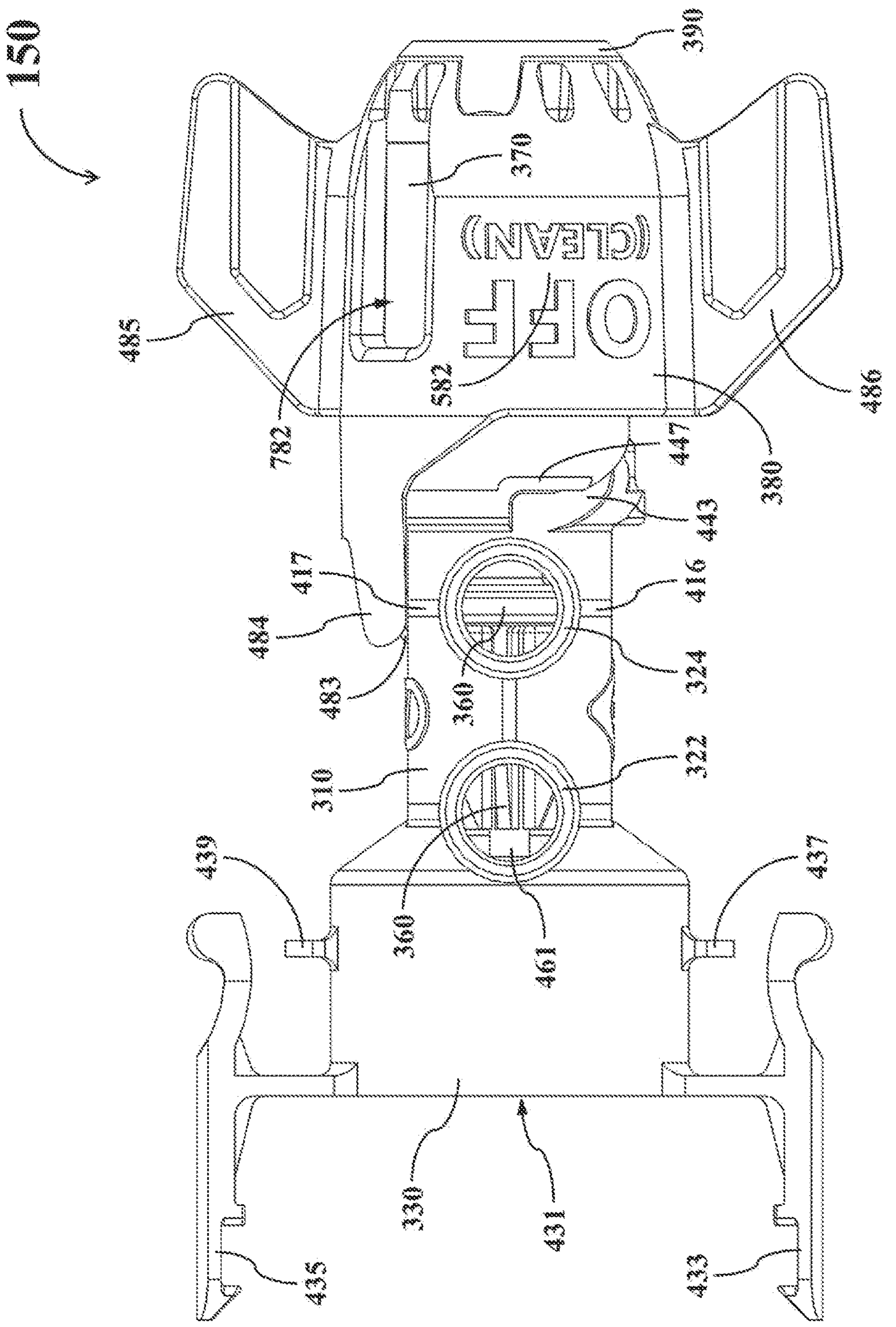
FIG. 27 shows a schematic top view diagram of the dual-mode fluid connector operating in the clean mode according to one embodiment of the present disclosure.

The operations of setting the dual-mode fluid connector 150 to the clean mode will be further described below by reference to FIG. 23 through FIG. 29. FIG. 23 shows a schematic rear view diagram of the dual-mode fluid connector 150 operating in a clean mode according to one embodiment of the present disclosure. FIG. 24 and FIG. 25 show simplified schematic diagrams of the dual-mode fluid connector 150 operating in the clean mode from different viewing angles according to one embodiment of the present disclosure. FIG. 26 shows a schematic side view diagram of the dual-mode fluid connector 150 operating in the clean mode according to one embodiment of the present disclosure. FIG. 27 shows a schematic top view diagram of the dual-mode fluid connector 150 operating in the clean mode according to one embodiment of the present disclosure.

As shown in FIG. 23, when the user wants to set the dual-mode fluid connector 150 to the clean mode, the user may rotate the rotatable element 380 toward a second predetermined direction (e.g., a counterclockwise direction). In this situation, the rotatable element 380 moves backward while rotating and drives the rod 360 to move backward together, so that the rod head 461 of the rod 360 disengages the stopper 242 of the outlet check valve 140 and causes the sealing portion 463 of the rod 360 to detach from the block element 415 in the chamber 411.

After the rod head 461 disengages the stopper 242, the spring (not shown in the figures) inside the outlet check valve 140 resumes the stopper 242 to its original position so that the output terminal of the outlet check valve 140 resumes to the close status. In addition, after the sealing portion 463 is detached from the block element 415 for a predetermined distance, the first space 412 of the chamber 411 and the cleaning tube 324 will be enabled to connect to each other through the second space 413.

As shown in FIG. 24 through FIG. 27, when the rotatable element 380 is rotated to a status where the second area 582 faces upward, the rod 360 will move backward for a predetermined distance due to the driving of the rotatable element 380, so as to ensure that the rod head 461 of the rod 360 disengages the stopper 242, and to ensure that the sealing portion 463 and the block element 415 are separated for enough distance, so that the liquid, such as detergent, bactericide, disinfectant, water, or the like, is enabled to flow smoothly between the first space 412 and the second space 413 of the chamber 411.

Figure 28:
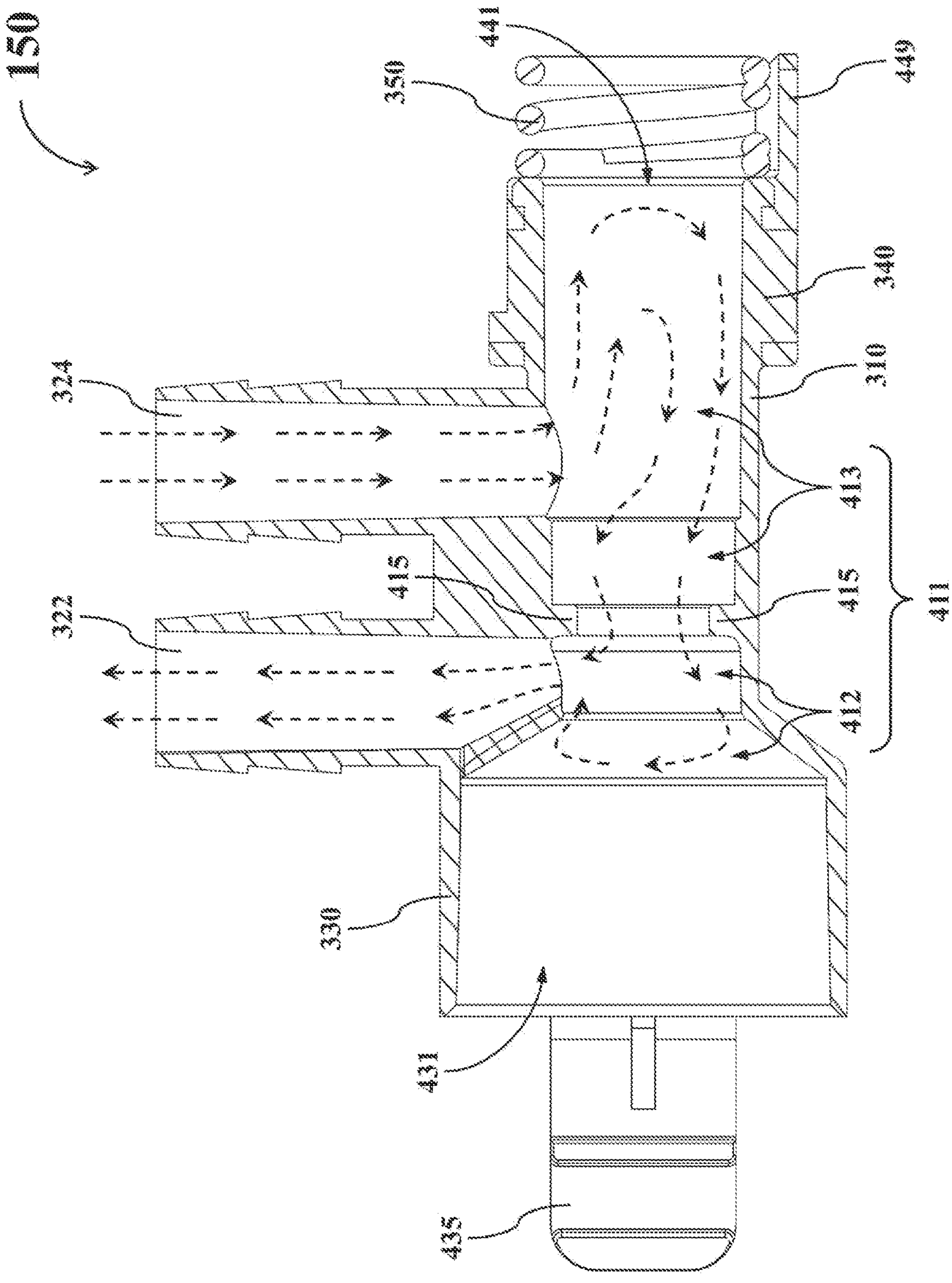
FIG. 28 shows a simplified schematic diagram illustrating the internal liquid flow direction of the dual-mode fluid connector operating in the clean mode according to one embodiment of the present disclosure.
Figure 29:
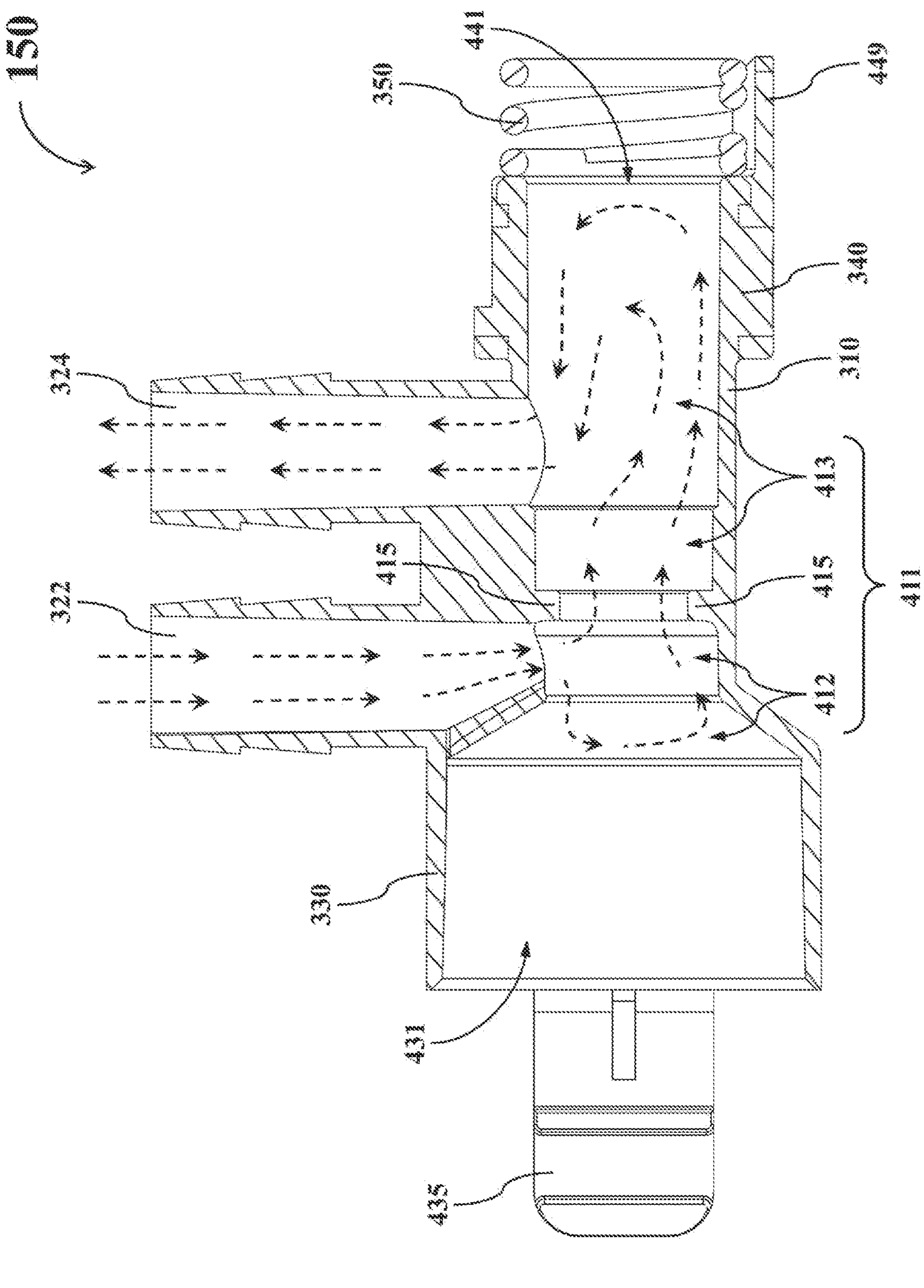
FIG. 29 shows a simplified schematic diagram illustrating the internal liquid flow direction of the dual-mode fluid connector operating in the clean mode according to another embodiment of the present disclosure.

Please refer to FIG. 28 and FIG. 29. FIG. 28 shows a simplified schematic diagram illustrating the internal liquid flow direction of the dual-mode fluid connector 150 operating in the clean mode according to one embodiment of the present disclosure. FIG. 29 shows a simplified schematic diagram illustrating the internal liquid flow direction of the dual-mode fluid connector 150 operating in the clean mode according to another embodiment of the present disclosure. To simplify the drawings, the rod 360, the bended plate 370, and the rotatable element 380 of the dual-mode fluid connector 150 are omitted in FIG. 28 and FIG. 29. The broken lines shown in FIG. 28 and FIG. 29 are utilized to show the possible flow direction of the liquid, such as detergent, bactericide, disinfectant, water, or the like, in the dual-mode fluid connector 150.

In the embodiment of FIG. 28, when the dual-mode fluid connector 150 operates in the clean mode, the liquid, such as detergent, bactericide, disinfectant, water, or the like, is enabled to flow into the second space 413 of the hollow connecting element 310 through the cleaning tube 324. The liquid, such as detergent, bactericide, disinfectant, water, or the like, entered into the second space 413 may flow into the first space 412 through the opening formed by the block element 415, and then may flow into the material tube 322 and the tube (not shown in the figures) connected to the material tube 322 through the first space 412.

In the embodiment of FIG. 29, when the dual-mode fluid connector 150 operates in the clean mode, the liquid, such as detergent, bactericide, disinfectant, water, or the like, is enabled to flow into the first space 412 of the hollow connecting element 310 through the material tube 322. The liquid, such as detergent, bactericide, disinfectant, water, or the like, entered into the first space 412 may flow into the second space 413 through the opening formed by the block element 415, and then may flow into the cleaning tube 324 and the tube (not shown in the figures) connected to the cleaning tube 324 through the second space 413.

In other words, in the embodiments of FIG. 28 and FIG. 29, when the dual-mode fluid connector 150 is switched to the clean mode, the material tube 322, the tube connected to the material tube 322, the cleaning tube 324, the tube connected to the cleaning tube 324, and the dual-mode fluid connector 150 are enabled to collectively form a cleaning loop.

In this situation, the automated beverage preparation apparatus 100 may utilize appropriate internal cleaning system (not shown in the figures) to deliver and circulate the liquid, such as detergent, bactericide, disinfectant, water, or the like, in the aforementioned cleaning loop, so as to conduct the cleaning, disinfection, and/or sterilization procedure to the dual-mode fluid connector 150 and the related tubes, components, and connectors in the automated beverage preparation apparatus 100. When the aforementioned cleaning procedure, disinfection procedure, and/or sterilization procedure is completed, the automated beverage preparation apparatus 100 may utilize appropriate tubes to discharge related waste liquid. In this way, it can achieve an automatic cleaning procedure, an automatic disinfection procedure, and/or an automatic sterilization procedure for the dual-mode fluid connector 150 and the related tubes, components, and connectors in the automated beverage preparation apparatus 100.

In practice, the operation of delivering and circulating the liquid, such as detergent, bactericide, disinfectant, water, or the like, in the aforementioned cleaning loop may be performed simply in accordance with the liquid flow direction shown in FIG. 28, may be performed simply in accordance with the liquid flow direction shown in FIG. 29, may be performed in accordance with the liquid flow direction shown in FIG. 28 and the liquid flow direction shown in FIG. 29 in turns, or may be performed alternatively in accordance with the liquid flow directions shown in FIG. 28 and FIG. 29.

If the dual-mode fluid connector 150 is replaced with a traditional one-way connector, it will be difficult for the automated beverage preparation apparatus 100 to conduct the aforementioned automatic cleaning procedure, automatic disinfection procedure, and automatic sterilization procedure. Obviously, the presence of the aforementioned dual-mode fluid connector 150 is very helpful in realizing the functionalities of automatic cleaning, automatic disinfection, and/or automatic sterilization for the automated beverage preparation apparatus 100.

Please note that during the whole cleaning procedure, disinfection procedure, and/or sterilization procedure elaborated above, the user does not need to detach the material tube 322 of the dual-mode fluid connector 150 from the currently connected tube, and does not need to detach the cleaning tube 324 of the dual-mode fluid connector 150 from the currently connected tube, nor does the user need to detach the dual-mode fluid connector 150 from the outlet check valve 140 of the material container 130.

Therefore, when the cleaning procedure, disinfection procedure, and/or sterilization procedure is completed, the user does not need to reconnect the material tube 322 of the dual-mode fluid connector 150 to the corresponding tube, and does not need to reconnect the cleaning tube 324 of the dual-mode fluid connector 150 to the corresponding tube, nor does the user need to reconnect the dual-mode fluid connector 150 to the outlet check valve 140 of the corresponding material container 130.

As can be appreciated from the foregoing descriptions, such mechanism not only significantly reduces the burden of the user, but also prevents fouling the surrounding environment, and reduces the possibility of that the dual-mode fluid connector 150 is scratched or even damaged.

As described previously, indication texts (e.g., "ON" and "SERVE"), indication symbols, indication images, and/or indication colors (e.g., blue, green, purple, or the like) for representing the serve mode may be arranged on the first area 581, while indication texts (e.g., "OFF" and "CLEAN"), indication symbols, indication images, and/or indication colors (e.g., yellow, orange, red, or the like) for representing the clean mode may be arranged on the second area 582. As can be appreciated from the foregoing descriptions, when the user rotates the rotatable element 380 to a status where the first area 581 faces upward, the dual-mode fluid connector 150 operates in the serve mode as shown in FIG. 4 through FIG. 7. When the user rotates the rotatable element 380 to a status where the second area 582 faces upward, the dual-mode fluid connector 150 operates in the clean mode as shown in FIG. 24 through FIG. 27.

Therefore, when the user sees that the rotatable element 380 is in the status where the first area 581 faces upward, the user can quickly understand that the current operation mode of the dual-mode fluid connector 150 is the serve mode. Similarly, when the user sees that the rotatable element 380 is in the status where the second area 582 faces upward, the user can quickly understand that the current operation mode of the dual-mode fluid connector 150 is the clean mode.

On the other hand, as described previously, indication texts, indication symbols, indication images, and/or indication colors (e.g., blue, green, purple, or the like) for representing the serve mode may be arranged on the first marked region 471 of the bended plate 370, while indication texts, indication symbols, indication images, and/or indication colors (e.g., yellow, orange, red, or the like) for representing the clean mode may be arranged on the second marked region 473. When the rotation direction and rotation angle of the rotatable element 380 varies, different regions of the outer surface of the bended plate 370 will be exposed from the first window 781 and/or the second window 782.

As shown in FIG. 4, FIG. 6, and FIG. 7, when the user rotates the rotatable element 380 to the status where the first window 781 faces upward, the first marked region 471 is exposed from the first window 781, and the dual-mode fluid connector 150 operates in the serve mode. As shown in FIG. 24, FIG. 25, and FIG. 27, when the user rotates the rotatable element 380 to the status where the second window 782 faces upward, the second marked region 473 is exposed from the second window 782, and the dual-mode fluid connector 150 operates in the clean mode.

Therefore, when the user sees that the rotatable element 380 is in the status where the first window 781 faces upward and the first marked region 471 is exposed from the first window 781, the user can quickly understand that the current operation mode of the dual-mode fluid connector 150 is the serve mode. Similarly, when the user sees that the rotatable element 380 is in the status where the second window 782 faces upward and the second marked region 473 is exposed from the second window 782, the user can quickly understand that the current operation mode of the dual-mode fluid connector 150 is the clean mode.

In this embodiment, the aforementioned spring 350 has another functionality. As described previously, when the user wants to set the dual-mode fluid connector 150 to the clean mode, the user may rotate the rotatable element 380 toward the aforementioned second predetermined direction. After the user rotates the rotatable element 380 to cause the first guiding element 487 to depart from the block wall portion 447, if the user releases the rotatable element 380 and does not continue to rotate the rotatable element 380 toward the aforementioned second predetermined direction, the elastic restoring force of the spring 350 will automatically push the rod 360 or the rotatable element 380 backward, so that the rotatable element 380 moves backward while rotating until the second elongated portion 484 engages with the second restriction element 417. Accordingly, after the first guiding element 487 departs from the block wall portion 447, if the user does not continue to manipulate the rotatable element 380, then the elastic restoring force of the spring 350 will automatically rotate the rotatable element 380 to the status where the second area 582 faces upward (or to the status where the second window 782 faces upward and the second marked region 473 is exposed from the second window 782).

In other words, after the first guiding element 487 departs from the block wall portion 447, if the user does not continue to manipulate the rotatable element 380, the spring 350 in this embodiment will utilize its elastic restoring force to automatically switch the dual-mode fluid connector 150 to the clean mode. Such mechanism can effectively avoid the dual-mode fluid connector 150 from operating in a grey area between the serve mode and the clean mode due to that the user did not rotate the rotatable element 380 to an appropriate angle.

On the other hand, as shown in FIG. 25 and FIG. 27, when the user or the spring 350 rotates the rotatable element 380 toward the aforementioned second predetermined direction to a certain extent, the second elongated portion 484 of the rotatable element 380 engages with the second restriction element 417 on the hollow connecting element 310 to prevent the rotatable element 380 from continuing to rotate toward the second predetermined direction. Such design can prevent the rotatable element 380 from being over-rotated by the user or the spring 350, thereby preventing the rod 360 from moving backward excessively.

If the rod 360 moves backward excessively, it may cause the rotatable element 380 to detach from the rear portion 340. Once the rotatable element 380 detaches from the rear portion 340, it may cause the liquid in the chamber 411 of the dual-mode fluid connector 150 to leak out from the through hole 441 of the rear portion 340.

Therefore, the cooperation of the aforementioned second elongated portion 484 and second restriction element 417 can effectively restrict the rotation angle of the rotatable element 380, thereby preventing the rotatable element 380 from accidentally detaching from the rear portion 340. As a result, it can prevent the user's improper manipulation of over-rotating the rotatable element 380, thereby reducing the problem of that the liquid in the chamber 411 leaks out from the through hole 441 of the rear portion 340.

As can be appreciated from the foregoing descriptions, the design of the aforementioned dual-mode fluid connector 150 enables the user to easily switch the dual-mode fluid connector 150 between two different operation modes by rotating the rotatable element 380. Such design is not only convenient in operation, but also very intuitive.

During the cleaning procedure, disinfection procedure, and/or sterilization procedure of the dual-mode fluid connector 150, the user does not need to detach the material tube 322 of the dual-mode fluid connector 150 from the currently connected tube, and does not need to detach the cleaning tube 324 of the dual-mode fluid connector 150 from the currently connected tube, nor does the user need to detach the dual-mode fluid connector 150 from the outlet check valve 140 of the material container 130.

Therefore, when the cleaning procedure, disinfection procedure, and/or sterilization procedure is completed, the user does not need to reconnect the material tube 322 to the corresponding tube, and does not need to reconnect the cleaning tube 324 to the corresponding tube, nor does the user need to reconnect the dual-mode fluid connector 150 to the outlet check valve 140 of the corresponding material container 130. Therefore, it can effectively save a lot of labor time, and would not easily foul the surrounding environment, and can effectively prevent the connector from being scratched or even damaged.

In addition, when the dual-mode fluid connector 150 is switched to the clean mode, the material tube 322, the tube connected to the material tube 322, the cleaning tube 324, the tube connected to the cleaning tube 324, and the dual-mode fluid connector 150 are enabled to collectively form a cleaning loop. In this situation, the automated beverage preparation apparatus 100 may deliver and circulate the liquid, such as detergent, bactericide, disinfectant, water, or the like, in the aforementioned cleaning loop, so as to conduct the cleaning procedure, disinfection procedure, and/or sterilization procedure to the dual-mode fluid connector 150 and the related tubes, components, and connectors in the automated beverage preparation apparatus 100. In this way, an automatic cleaning procedure, an automatic disinfection procedure, and/or an automatic sterilization procedure for the dual-mode fluid connector 150 and the related tubes, components, and connectors in the automated beverage preparation apparatus 100 can be achieved.

If the dual-mode fluid connector 150 is replaced with a traditional one-way connector, it will be difficult for the automated beverage preparation apparatus 100 to conduct the aforementioned automatic cleaning procedure, automatic disinfection procedure, and automatic sterilization procedure. Obviously, the presence of the aforementioned dual-mode fluid connector 150 is very helpful in realizing the functionalities of automatic cleaning, automatic disinfection, and/or automatic sterilization for the automated beverage preparation apparatus 100.

Please note that the quantity, shape, or position of some components in the aforementioned dual-mode fluid connector 150 may be modified depending on the requirement of practical applications, rather than being restricted to the pattern shown in the aforementioned embodiments.

For example, the shape, width, and/or diameter of the aforementioned hollow connecting element 310, head portion 330, and rear portion 340 may be modified depending on the requirement of practical applications. In some embodiments, the diameter or inner diameter of the hollow connecting element 310 may be designed to be the same as the diameter or inner diameter of the head portion 330, or may be designed to be larger than the diameter or inner diameter of the head portion 330. In other embodiments, the diameter or inner diameter of the hollow connecting element 310 may be designed to be larger than the diameter or inner diameter of the rear portion 340, or may be designed to be smaller than the diameter or inner diameter of the rear portion 340.

For another example, in some embodiments, the spring 350 may be omitted.

For yet another example, the rod 360 may be directly integrated in the rotatable element 380 by using various appropriate approaches. In this situation, the block portion 489 of the rotatable element 380 may be omitted.

For yet another example, the plug 390 may be directly integrated in the rotatable element 380 by using various appropriate approaches. In this situation, the rear opening 482 and the block portion 489 of the rotatable element 380 may be omitted.

For yet another example, the aforementioned first restriction element 416 and/or second restriction element 417 of the hollow connecting element 310 may be omitted. In this situation, it may simply utilize the cleaning tube 324 to act as the first restriction element 416 and/or the second restriction element 417.

For yet another example, the shape, length, and/or width of the aforementioned first clamp element 433 and second clamp element 435 may be modified depending on the requirement of practical applications.

For yet another example, the aforementioned first clamp element 433 and second clamp element 435 may be instead connected to the outside of the hollow connecting element 310.

For yet another example, the aforementioned first clamp element 433 or second clamp element 435 may be omitted. In this situation, the corresponding first protruding element 437 or second protruding element 439 may be omitted.

For yet another example, in some embodiments where the connection stability between the head portion 330 and the outlet check valve 140 is sufficient, the aforementioned first clamp element 433 and second clamp element 435 may be omitted. In this situation, the corresponding first protruding element 437 and second protruding element 439 may be omitted.

For yet another example, the aforementioned first protruding element 437 and/or second protruding element 439 on the head portion 330 may be omitted. In this situation, the rear portion of the corresponding first clamp element 433 or second clamp element 435 may be shortened or omitted.

For yet another example, the aforementioned first spiral track 443 on the rear portion 340 may be modified to be a first straight track perpendicular to the block wall portion 447, the aforementioned second spiral track 445 may be modified to be a second straight track parallel to the first straight track, and the first straight track and the second straight track may be respectively arranged on two opposite sides of the outer surface of the rear portion 340. In this embodiment, when the user wants to set the dual-mode fluid connector 150 to the serve mode, the user may push the rotatable element 380 toward the head portion 330. In this situation, the first guiding element 487 and the second guiding element 488 of the rotatable element 380 are respectively moved forward along the first straight track and the second straight track, and the rotatable element 380 drives the rod 360 to move straight forward at the same time, so that the sealing portion 463 of the rod 360 abuts the block element 415 in the chamber 411 and renders the rod head 461 to push the stopper 242 of the outlet check valve 140 inward. While the rod 360 or the rotatable element 380 moves toward the head portion 330, the outer flange 465 and the outer flange 467 of the rod 360 or the block portion 489 inside the rotatable element 380 compresses the spring 350. When the first guiding element 487 of the rotatable element 380 reaches a position beside the block wall portion 447, the user may rotate the rotatable element 380 so that the block wall portion 447 engages with the first guiding element 487. In this way, it can be ensured that when the dual-mode fluid connector 150 operates in the serve mode, the first space 412 and the second space 413 of the chamber 411 can be kept isolated, so as to prevent the liquid material from erroneously flowing into the cleaning tube 324.

For yet another example, the aforementioned second spiral track 445 and/or second straight track of the rear portion 340 may be omitted. In this situation, the second guiding element 488 of the rotatable element 380 may be omitted.

For yet another example, the aforementioned outer flange 465 and/or outer flange 467 of the rod 360 may be omitted.

For yet another example, the aforementioned slot 469 of the rod 360 may be omitted. In this situation, the shape of the plug 390 may be adaptively modified, or the rear opening 482 of the rotatable element 380 may be omitted.

For yet another example, the aforementioned first elongated portion 483 and/or second elongated portion 484 of the rotatable element 380 may be omitted.

For yet another example, the aforementioned first fin 485 and/or second fin 486 of the rotatable element 380 may be omitted.

For yet another example, the aforementioned first area 581 and/or second area 582 of the rotatable element 380 may be omitted.

For yet another example, the aforementioned first window 781 or second window 782 of the rotatable element 380 may be omitted. In this situation, the first marked region 471 or the second marked region 473 of the bended plate 370 may be omitted.

For yet another example, the aforementioned first window 781 and second window 782 of rotatable element 380 may be omitted. In this situation, the first marked region 471 and the second marked region 473 of the bended plate 370 may be omitted, or the entire bended plate 370 may be omitted.

Certain terms are used throughout the description and the claims to refer to particular components. One skilled in the art appreciates that a component may be referred to as different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. Accordingly, if this disclosure mentioned that a first device is coupled with a second device, it means that the first device may be directly or indirectly connected to the second device through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the function of a particular element or to describe the relationship of one element to another element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when a component is referred to as being "positioned on," "positioned above," "connected to," "engaged with," or "coupled with" another component, it can be directly on, directly connected to, or directly engaged with the other component, or intervening component may be present. In contrast, when a component is referred to as being "directly on," "directly connected to," or "directly engaged with" another component, there are no intervening components present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A dual-mode fluid connector (150), comprising:

a hollow connecting element (310), comprising a chamber (411) inside the hollow connecting element (310);

a material tube (322), positioned on the hollow connecting element (310) and connected through the chamber (411);

a cleaning tube (324), positioned on the hollow connecting element (310) and connected through the chamber (411);

a head portion (330), positioned on one terminal of the hollow connecting element (310) and comprising a connecting opening (431), wherein the connecting opening (431) is connected through the chamber (411) and capable of being detachably connected to a material container (130);

a rear portion (340), positioned on another terminal of the hollow connecting element (310) and comprising a through hole (441);

a rod (360), inserted into the chamber (411) via the through hole (441) and comprising a rod head (461) and an outer flange (467); and a rotatable element (380), covered on the rear portion (340) and comprising a block portion (489), wherein the block portion (489) is positioned in an interior of the rotatable element (380) and arranged to operably engage with the outer flange (467).

2. The dual-mode fluid connector (150) of claim 1, wherein the rotatable element (380) is arranged to operably drive the rod (360) to move forward or backward.

3. The dual-mode fluid connector (150) of claim 2, wherein a track (443) is arranged on an outer surface of the rear portion (340), the rotatable element (380) comprises a guiding element (487), the guiding element (487) is positioned in the interior of the rotatable element (380) and arranged to operably moved along the track (443);

wherein the block portion (489) drives the rod (360) to move forward or backward together with the rotatable element (380).

4. The dual-mode fluid connector (150) of claim 3, wherein the rod (360) comprises a sealing portion (463), a protuberant block element (415) is arranged on an inner surface of the chamber (411), the block element (415) divides an interior space of the chamber (411) into a first space (412) and a second space (413), and when the rotatable element (380) is rotated toward a first predetermined direction, the rotatable element (380) moves forward while rotating and drives the rod (360) to move forward until the sealing portion (463) abuts the block element (415);

wherein when the sealing portion (463) abuts the block element (415), the first space (412) and the second space (413) are separated by the sealing portion (463) and the block element (415) so that the first space (412) and the second space (413) are isolated with each other, and the rod head (461) pushes a stopper (242) on the outlet check valve (140) inward to render an output terminal of the outlet check valve (140) to become an open status.

5. The dual-mode fluid connector (150) of claim 4, wherein after the sealing portion (463) abuts the block element (415), if the rotatable element (380) is rotated toward a second predetermined direction, then the rotatable element (380) moves backward while rotating and drives the rod (360) to move backward together, so that the sealing portion (463) detaches from the block element (415);

wherein after the sealing portion (463) detaches from the block element (415) for a predetermined distance, the first space (412) and the cleaning tube (324) are enabled to communicate with each other, and the rod head (461) detaches from the stopper (242) to render the output terminal of the outlet check valve (140) to become a close status.

6. The dual-mode fluid connector (150) of claim 5, wherein an outer surface of the rotatable element (380) comprises a first area (581) and a second area (582), the dual-mode fluid connector (150) operates in a serve mode when the rotatable element (380) is rotated to a status where the first area (581) faces upward, and the dual-mode fluid connector (150) operates in a clean mode when the rotatable element (380) is rotated to a status where the second area (582) faces upward.

7. The dual-mode fluid connector (150) of claim 5, further comprising:

a bended plate (370), positioned between the rotatable element (380) and the rear portion (340), and an outer surface of the bended plate (370) comprises a first marked region (471) and a second marked region (473);

wherein the rotatable element (380) further comprises a first window (781) and a second window (782), and when the rotatable element (380) is rotated to a status where the first window (781) faces upward, the first marked region (471) is exposed from the first window (781) and the dual-mode fluid connector (150) operates in a serve mode; and when the rotatable element (380) is rotated to a status where the second window (782) faces upward, the second marked region (473) is exposed from the second window (782) and the dual-mode fluid connector (150) operates in a clean mode.

8. The dual-mode fluid connector (150) of claim 4, wherein the rear portion (340) further comprises a block wall portion (447) positioned on one side of an end section of the track (443), and when the rotatable element (380) drives the rod (360) to move forward so that the sealing portion (463) abuts the block element (415), the guiding element (487) enters the end section of the track (443) so that the block wall portion (447) supports the guiding element (487).

9. The dual-mode fluid connector (150) of claim 8, further comprising:

a spring (350), positioned between the rear portion (340) and the rotatable element (380) or between the rear portion (340) and the outer flange (467), and when the rotatable element (380) drives the rod (360) to move forward, the block portion (489) or the outer flange (467) compresses the spring (350);

wherein when the guiding element (487) disengages with the block wall portion (447), the spring (350) applies an elastic restoring force on the block portion (489) or the outer flange (467) to push the rotatable element (380) or the rod (360) backward.

10. The dual-mode fluid connector (150) of claim 3, further comprising:

a spring (350), positioned between the rear portion (340) and the rotatable element (380) or between the rear portion (340) and the outer flange (467), and when the rotatable element (380) drives the rod (360) to move forward, the block portion (489) or the outer flange (467) compresses the spring (350);

wherein the rear portion (340) further comprises a block wall portion (447) positioned on one side of an end section of the track (443), and when the guiding element (487) disengages with the block wall portion (447), the spring (350) applies an elastic restoring force on the block portion (489) or the outer flange (467) to push the rotatable element (380) or the rod (360) backward.

11. The dual-mode fluid connector (150) of claim 10, wherein the hollow connecting element (310) further comprises a second restriction element (417) extended outward from an outer surface of the hollow connecting element (310), and the rotatable element (380) further comprises a second elongated portion (484) extended from an edge of a front opening (481) of the rotatable element (380) toward the head portion (330);

wherein when the rotatable element (380) is rotated toward a second predetermined direction to a certain extent, the second elongated portion (484) engages with the second restriction element (417) to prevent the rotatable element (380) from continuing to rotate toward the second predetermined direction.

12. The dual-mode fluid connector (150) of claim 3, wherein the hollow connecting element (310) further comprises a first restriction element (416) extended outward from an outer surface of the hollow connecting element (310), and the rotatable element (380) further comprises a first elongated portion (483) extended from an edge of a front opening (481) of the rotatable element (380) toward the head portion (330);

wherein when the rotatable element (380) is rotated toward a first predetermined direction to a certain extent, the first elongated portion (483) engages with the first restriction element (416) to prevent the rotatable element (380) from continuing to rotate toward the first predetermined direction.

13. The dual-mode fluid connector (150) of claim 12, wherein the hollow connecting element (310) further comprises a second restriction element (417) extended outward from the outer surface of the hollow connecting element (310), and the rotatable element (380) further comprises a second elongated portion (484) extended from the edge of the front opening (481) of the rotatable element (380) toward the head portion (330);

wherein when the rotatable element (380) is rotated toward a second predetermined direction to a certain extent, the second elongated portion (484) engages with the second restriction element (417) to prevent the rotatable element (380) from continuing to rotate toward the second predetermined direction.

14. The dual-mode fluid connector (150) of claim 3, wherein the hollow connecting element (310) further comprises a second restriction element (417) extended outward from an outer surface of the hollow connecting element (310), and the rotatable element (380) further comprises a second elongated portion (484) extended from an edge of a front opening (481) of the rotatable element (380) toward the head portion (330);

wherein when the rotatable element (380) is rotated toward a second predetermined direction to a certain extent, the second elongated portion (484) engages with the second restriction element (417) to prevent the rotatable element (380) from continuing to rotate toward the second predetermined direction.

15. The dual-mode fluid connector (150) of claim 3, further comprising:

one or more clamp elements (433, 435), positioned on sides of the head portion (330), and when the connecting opening (431) is connected to an outlet check valve (140) on the material container (130), the one or more clamp elements (433, 435) engage with a protruding portion (244) of the outlet check valve (140).

16. The dual-mode fluid connector (150) of claim 2, wherein the rotatable element (380) further comprises:

one or more fins (485, 486), positioned on an outer surface of the rotatable element (380), and arranged to operably facilitate a user to rotate the rotatable element (380).

17. The dual-mode fluid connector (150) of claim 2, wherein the rod (360) comprises a sealing portion (463), a protuberant block element (415) is arranged on an inner surface of the chamber (411), and the block element (415) divides an interior space of the chamber (411) into a first space (412) and a second space (413);

wherein when the rotatable element (380) is rotated toward a first predetermined direction, the rotatable element (380) moves forward while rotating and drives the rod (360) to move forward until the sealing portion (463) abuts the block element (415), and when the sealing portion (463) abuts the block element (415), the first space (412) and the second space (413) are separated by the sealing portion (463) and the block element (415) so that the first space (412) and the second space (413) are isolated with each other.

18. The dual-mode fluid connector (150) of claim 2, wherein the rod (360) comprises a sealing portion (463), a protuberant block element (415) is arranged on an inner surface of the chamber (411), and the block element (415) divides an interior space of the chamber (411) into a first space (412) and a second space (413);

wherein when the rotatable element (380) moves toward the head portion (330), the rotatable element (380) drives the rod (360) to move forward until the sealing portion (463) abuts the block element (415), and when the sealing portion (463) abuts the block element (415), the first space (412) and the second space (413) are separated by the sealing portion (463) and the block element (415) so that the first space (412) and the second space (413) are isolated with each other.

* * * * *